(12) United States Patent
Abe et al.

(10) Patent No.: US 12,169,744 B2
(45) Date of Patent: Dec. 17, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Seiji Abe, Kanagawa (JP); Naoko Baba, Kanagawa (JP); Kouta Murasawa, Kanagawa (JP); Hiromitsu Yamaguchi, Kanagawa (JP); Keiji Kuriyama, Saitama (JP); Yuki Igarashi, Tokyo (JP); Hiroshi Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/418,128

(22) Filed: Jan. 19, 2024

(65) Prior Publication Data

US 2024/0160874 A1 May 16, 2024

Related U.S. Application Data

(62) Division of application No. 17/665,215, filed on Feb. 4, 2022, now Pat. No. 11,915,070.

(30) Foreign Application Priority Data

Feb. 9, 2021 (JP) .................................. 2021-019362

(51) Int. Cl.
*G06K 15/02* (2006.01)
*C09D 11/38* (2014.01)

(52) U.S. Cl.
CPC ....... *G06K 15/027* (2013.01); *G06K 15/1878* (2013.01); *C09D 11/38* (2013.01)

(58) Field of Classification Search
CPC ... G06K 15/027; G06K 15/1878; C09D 11/38
See application file for complete search history.

(56) References Cited

U.S. PATENT DOCUMENTS

| 7,355,750 B2 | 4/2008 | Saito et al. | ..................... 358/1.9 |
| 7,365,890 B2 | 4/2008 | Saito et al. | ................... 358/523 |

(Continued)

FOREIGN PATENT DOCUMENTS

| JP | 2014-136413 | 7/2014 |
| JP | 2019-181863 | 10/2019 |

OTHER PUBLICATIONS

Extended European Search Report dated Jun. 8, 2022 in counterpart EP Application No. 22154935.5.

*Primary Examiner* — Quang N Vo
(74) *Attorney, Agent, or Firm* — Venable LLP

(57) ABSTRACT

An object of the present disclosure is to implement, at a low cost, highly accurate color calibration in a printing apparatus that performs printing using fluorescent ink. One embodiment of the present invention is an image processing apparatus that includes: a processing unit configured to perform processing relating to color calibration in a printing apparatus that prints an image on a printing medium using fluorescent printing material; and an execution unit configured to perform calibration processing of the printing apparatus based on a measured value that is obtained by measuring a patch chart for obtaining information on an amount of application of the fluorescent printing material in the printing apparatus, wherein a patch included in the patch chart is printed with the fluorescent printing material and subtractive color mixture printing material and at least one dot of the subtractive color mixture printing material covers a dot of the fluorescent printing material.

18 Claims, 17 Drawing Sheets

(56) References Cited

U.S. PATENT DOCUMENTS

| | | |
|---|---|---|
| 8,289,592 B2 | 10/2012 | Mori .............................. 358/518 |
| 8,456,709 B2 | 6/2013 | Uratani et al. ............... 358/3.23 |
| 8,526,083 B2 | 9/2013 | Mori .............................. 358/518 |
| 8,553,278 B2 | 10/2013 | Mori .............................. 358/1.9 |
| 2009/0278919 A1 | 11/2009 | Ramstad ................ H04N 13/04 |
| 2013/0027723 A1* | 1/2013 | Coyle ................... B82Y 30/00 |
| | | 358/1.9 |
| 2013/0258366 A1 | 10/2013 | Miyazaki .................. G01J 3/46 |
| 2014/0320927 A1* | 10/2014 | Kuo ......................... H04N 1/54 |
| | | 358/2.1 |
| 2017/0247560 A1 | 8/2017 | Watanabe et al. ...... C09D 11/40 |
| 2020/0007695 A1 | 1/2020 | Kagawa et al. ......... H04N 1/60 |
| 2021/0218865 A1 | 7/2021 | Tsuchiya et al. ........ H04N 1/48 |

\* cited by examiner

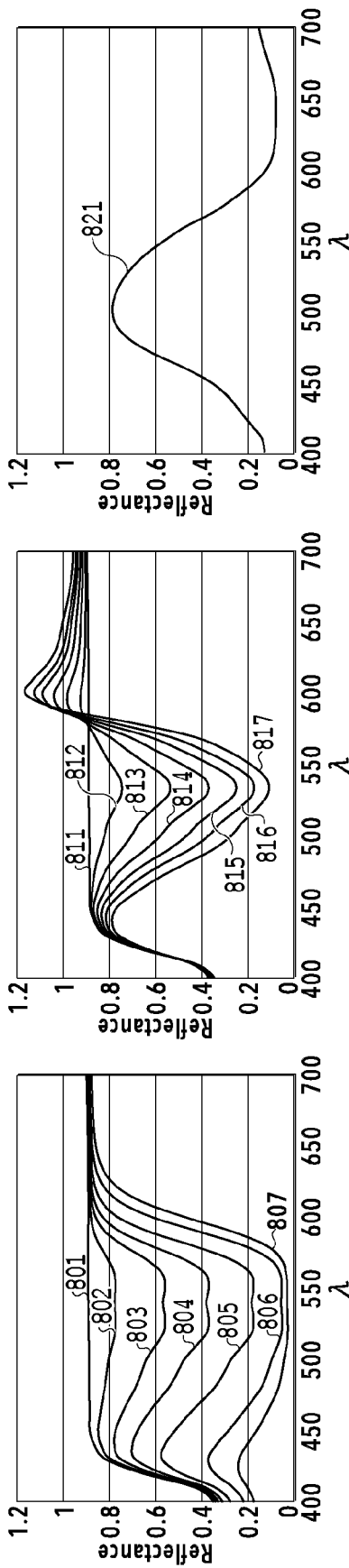
FIG.8A
FIG.8B
FIG.8C
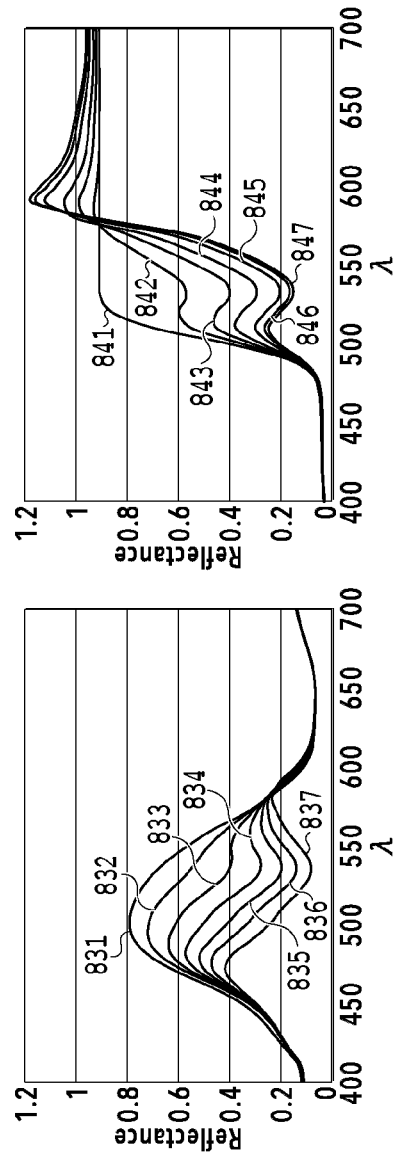
FIG.8D
FIG.8E

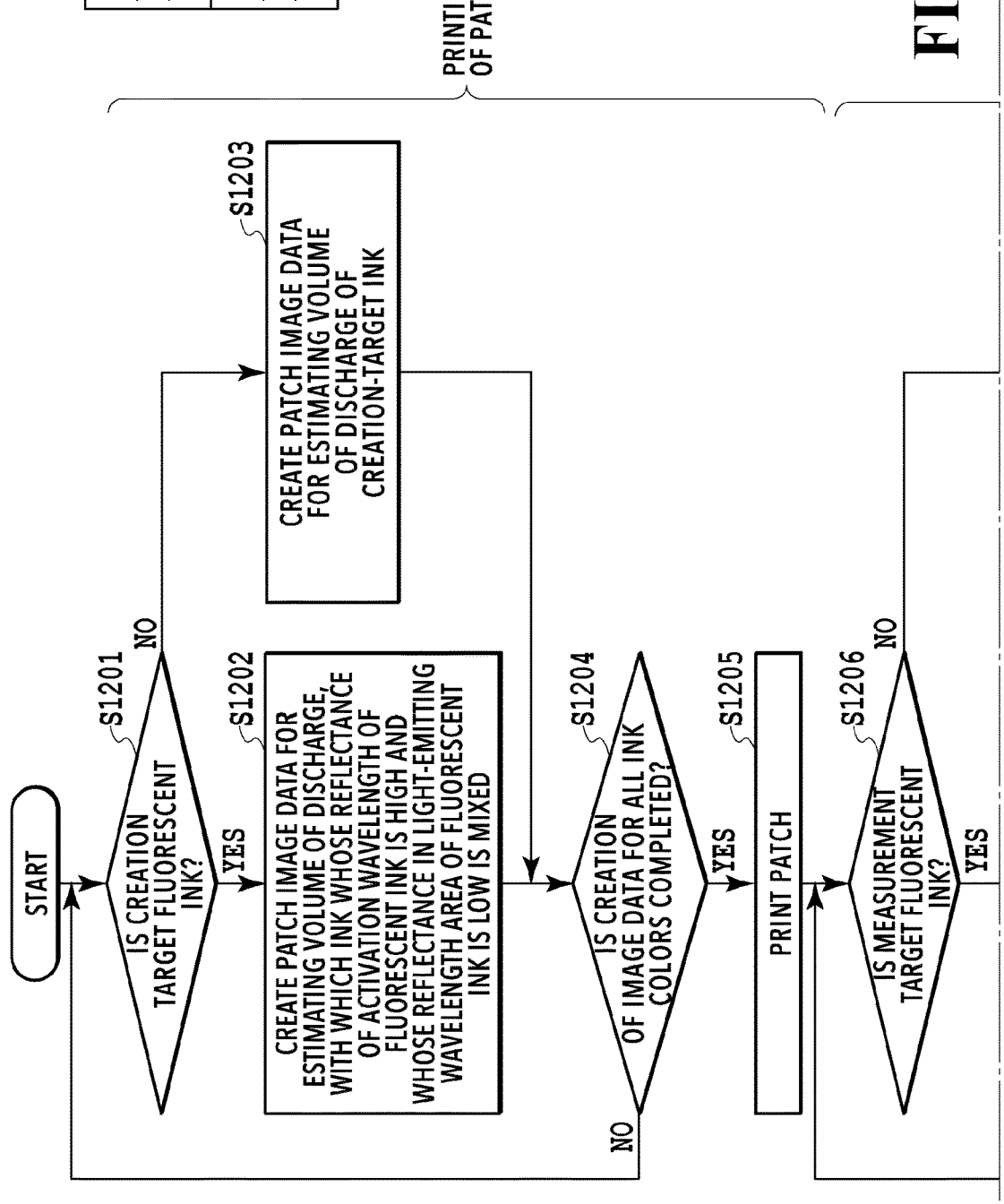

IMAGE PROCESSING APPARATUS, IMAGE PROCESSING METHOD, AND STORAGE MEDIUM

This application is a divisional of application Ser. No. 17/665,215 filed Feb. 4, 2022, currently pending; and claims priority under 35 U.S.C. § 119 to Japan Application JP 2021-019362 filed in Japan on Feb. 9, 2021; and the contents of all of which are incorporated herein by reference as if set forth in full.

BACKGROUND OF THE INVENTION

Field of the Invention

The present disclosure relates to a technique to make uniform the printed color tone among printing apparatuses in a system having a plurality of printing apparatus.

Description of the Related Art

Conventionally, color calibration is known in which a printed halftone patch is read by a measuring device and the color density of a printing apparatus is made uniform among the apparatuses by changing the amount of ink to be discharged.

An attempt to obtain the color density and the color value (for example, CIE L*a*b*, tri-stimulus values XYZ or the like) by using a diffraction grating filter in a measuring device will make the measuring device expensive. On the other hand, in a case where the density characteristic is obtained by obtaining a reflection coefficient using a light source (for example, LED or the like) having a bandwidth in predetermined wavelengths and a light-receiving element (for example, photodiode or the like), there is a possibility that trouble occurs at the time of measuring fluorescent ink. The reason is that due to the characteristic to emit light on the side of the wavelength longer than the wavelength area of incident light, the difference in reflection coefficient between halftone patches becomes less.

Consequently, in order to introduce color management by highly accurate calibration in a printing system having a plurality of printing apparatuses, it is necessary to use an expensive measuring device capable of separating the wavelength area of light that is received into small areas, and therefore, the cost of introduction of the printing system is raised.

Japanese Patent Laid-Open No. 2014-136413 has disclosed a method of creating a color shift correction table based on the density characteristic in conformity to visual sensation by correcting the actually measured density detected by an optical sensor in accordance with fluorescence information on ink as a technique relating to color calibration of fluorescent ink. Specifically, correction to weight the actually measured density in conformity to visual sensation.

SUMMARY OF THE INVENTION

However, in a case where the difference between read signal values of the sensor for the difference in density becomes small due to light emission of fluorescence, the influence of the reading error of the sensor (S/N ratio of the sensor) becomes large. As a result of that, even by attaching a weight in conformity to the visual characteristic to the read value of the sensor as in Japanese Patent Laid-Open No. 2014-136413, it is not possible to increase the reading accuracy of the sensor, and therefore, there is such a problem that the correction accuracy of calibration reduces. Further, in order to increase the S/N ratio of the sensor, it is necessary to prepare a highly sensitive sensor, and therefore, the cost of the sensor device is raised.

Consequently, in view of the above-described problem, an object of one embodiment of the present invention is to implement, at a low cost, highly accurate color calibration in a printing apparatus that performs printing using fluorescent ink.

One embodiment of the present invention is an image processing apparatus that includes: a processing unit configured to perform processing relating to color calibration in a printing apparatus that prints an image on a printing medium using fluorescent printing material; and an execution unit configured to perform calibration processing of the printing apparatus based on a measured value that is obtained by measuring a patch chart for obtaining information on an amount of application of the fluorescent printing material in the printing apparatus, wherein a patch included in the patch chart is printed with the fluorescent printing material and subtractive color mixture printing material and at least one dot of the subtractive color mixture printing material covers a dot of the fluorescent printing material.

Further features of the present invention will become apparent from the following description of exemplary embodiments with reference to the attached drawings.

BRIEF DESCRIPTION OF THE DRAWINGS

FIG. 8A to FIG. 8E are each a diagram of spectral reflectance;

FIG. 12 is a diagram showing the relationship of FIG. 12A and FIG. 12B;

FIG. 12A and FIG. 12B represent a flowchart of calibration processing;

DESCRIPTION OF THE EMBODIMENTS

In the following, embodiments of the present invention are explained by using the drawings.

First Embodiment

<Image Processing Unit of Printing Apparatus>

In the following, a printing apparatus having an image processing unit in the present embodiment is explained. As the printing apparatus, specifically, an ink jet printer (in the following, also referred to simply as "printer") is supposed. The printer internally includes LED light sources of RGB for measuring a printed patch chart and a color sensor consisting of a light-receiving element, which is a photodiode The printer prints any patch chart and the printed patch chart can be measured with this color sensor. Further, it is also possible for the printer to function simply as a printing apparatus and perform printing processing based on printing-target data, such as a document and an image having been processed by various kinds of software.

The printer has, as color materials, six color inks of C (cyan), M (magenta), Y (yellow), K (black), FP (fluorescent pink), and G (green). The combination of inks is not limited to this. For example, the combination with particular color inks of R (red), Or (orange), B (blue), Gy (gray) and the like may be accepted and the combination may have Lc (light cyan) obtained by diluting C (cyan) and Lm (light magenta) obtained by diluting M (magenta). Further, it may also be possible to use FB (fluorescent blue) and FY (fluorescent yellow) in place of FP (fluorescent pink).

<About Configuration Relating to Color Conversion Processing>

Figure 1:
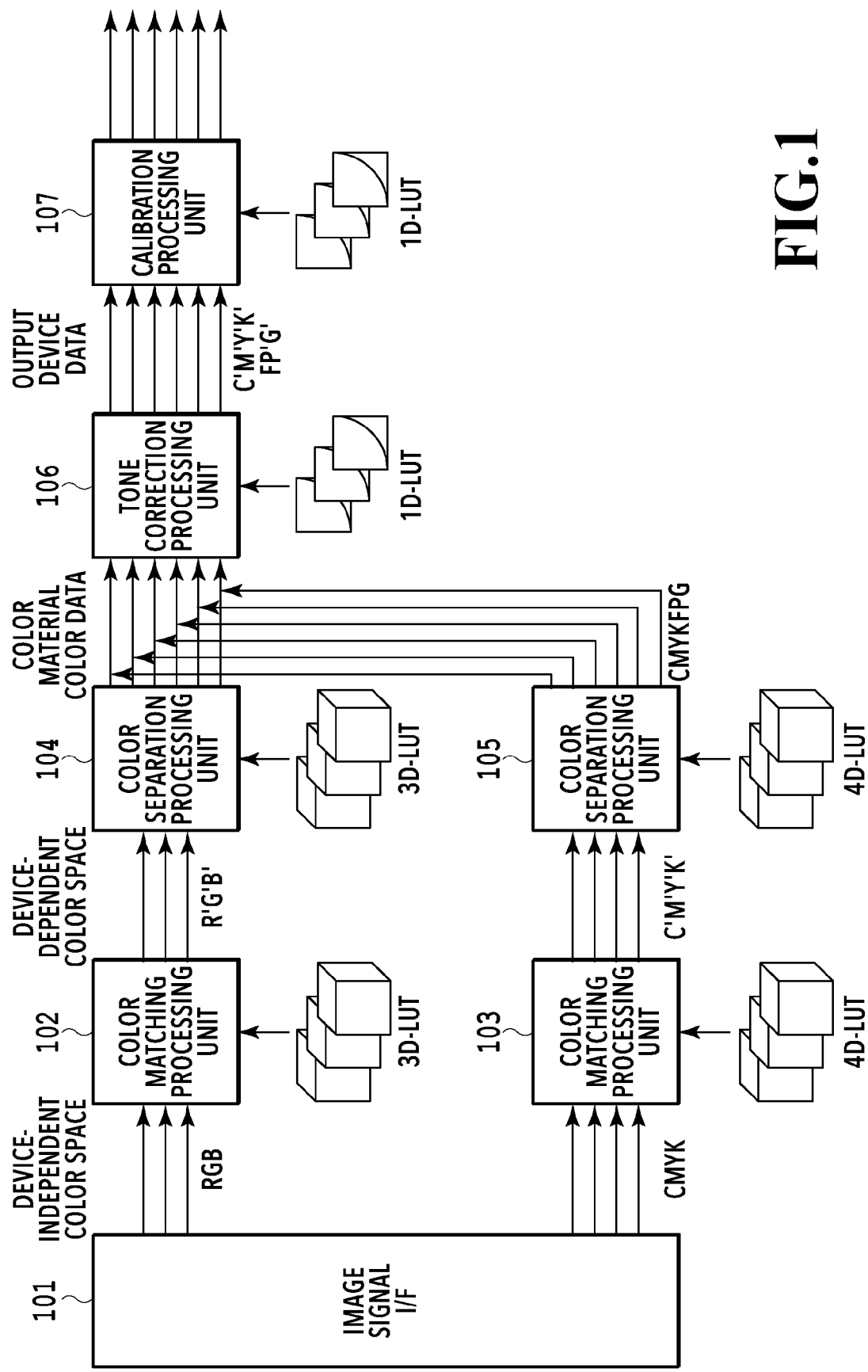
FIG. 1 is a block diagram showing a configuration relating to color conversion processing of an image processing unit.

FIG. 1 is a block diagram showing the configuration relating to color conversion processing of an image processing unit in the present embodiment. It is assumed that the printer in the present embodiment has both the function of an RGB printer to which RGB signals are input and the function of a CMYK printer to which CMYK signals are input. Further, for convenience of explanation, it is assumed that image data is processed as a signal value in which each color is represented by eight bits. However, it is needless to say that the same effect can be obtained in a case where the pixel value of each pixel of image data is represented by ten bits, 12 bits, or 16 bits.

An image signal I/F 101 is an I/F unit of input image data and in the present embodiment, image data of RGB signals and image data of CMYK signals are input. For image data of RGB signals, conversion processing by a color matching processing unit 102 is performed, which converts color data in a device-independent space into color data in a device-dependent space. Similarly, for image data of CMYK signals, conversion processing by a color matching processing unit 103 is performed, which converts color data in a device-independent space into color data in a device-dependent space.

For the image data that is output from the color matching processing unit 102, by a color separation processing unit 104, color separation processing to convert color data in a device-dependent space into color material color data is performed. Similarly, for the image data that is output from the color matching processing unit 103, by a color separation processing unit 105, color separation processing to convert color data in a device-dependent space into color material color data is performed.

For the color material color data that is output from the color separation processing units 104 and 105, by a tone correction processing unit 106, tone correction processing for matching the color material color data with the output characteristic of the printer is performed.

It is possible for each of the color matching processing units 102 and 103 and the color separation processing units 104 and 105 to perform desired color conversion for the input image data by setting a dedicated lookup table (in the following, described as LUT). The LUT that is used here is provided and managed for each printing medium and for each printing mode, such as high-speed printing and low-speed high quality printing.

As regards the processing units described previously, the color matching processing unit 102 and the color separation processing unit 104 each perform color conversion processing by using a 3D-LUT. The color matching processing unit 103 and the color separation processing unit 105 each perform color conversion processing by using a 4D-LUT. The tone correction processing unit 106 performs color conversion processing by using a 1D-LUT. The 3D-LUT that is used by the color matching processing unit 102 and the color separation processing unit 104 is, specifically, a 3D-LUT consisting of 16 grids at 17 count intervals for each color, that is, consisting of 16×16×16=4,096 grids.

As shown in FIG. 1, the image processing unit has a calibration processing unit 107. The calibration processing unit 107 corrects the color variation of printing results, which is caused by individual differences in devices constituting the printer, printing media, color materials and the like, and the variation in volume of discharge resulting from the change over time of the devices. Specifically, the calibration processing unit 107 performs processing using a 1D-LUT for each color material color signal. The reason this processing is performed is for matching the density value in the printing unit for the input data value of an actual printing apparatus with a calibration target value, which is the density value in the printing unit for the input value of a reference apparatus.

In the present embodiment, the configuration in which the printing apparatus has the image processing unit is described, but it may also be possible to provide the image processing unit separate from the printing apparatus and for example, it may also be possible for an information processing apparatus, such as a personal computer, to perform the function of the image processing unit.

<About Patch Chart>

Figure 2:
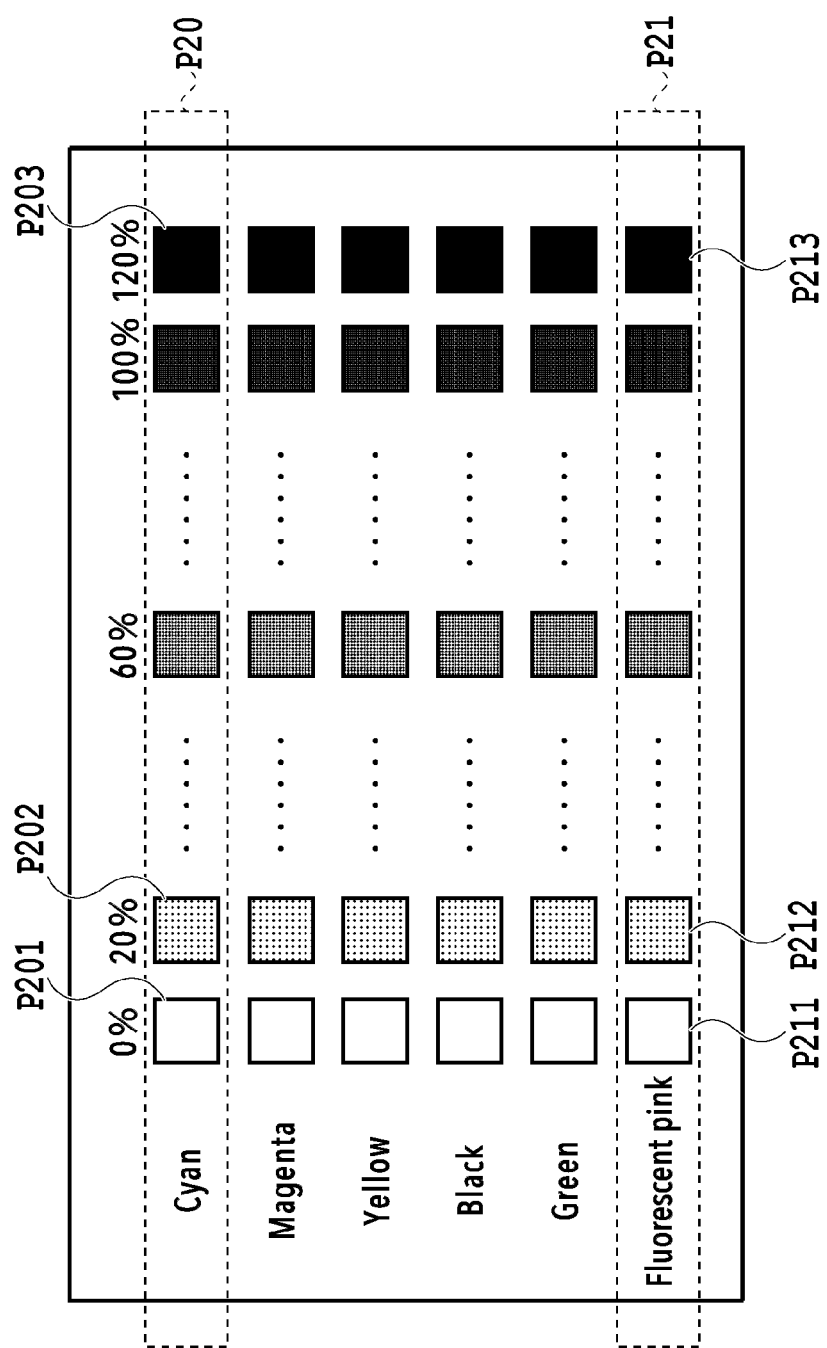
FIG. 2 is a diagram showing a patch chart.

FIG. 2 shows a patch part for measuring the density value at the time of actual printing for predetermined input data value as printing results of an actual printing apparatus, which is used at the time of execution of calibration. This patch chart has a plurality of patches for each ink.

In the patches of cyan, magenta, yellow, black, and green, for the ink of each color material, the input signal of the color material color is changed at an interval of 20% and by measuring the color of the printed patch chart, it is possible to estimate the volume of discharge corresponding to each color material in the printer. For example, a patch P20 of cyan is printed only in cyan ink and a patch 201 is printed in cyan ink whose applying amount is 0%, a patch P202 is printed in cyan ink whose applying amount is 20%, and a patch P203 is printed in cyan ink whose applying amount is 120%.

In contrast to this, a patch of fluorescent pink is printed by the color material of fluorescent pink whose input signal is changed at an interval of 20% and the color material of green whose input signal is fixed to an input signal of a constant amount of 80%. That is, a patch P21 of fluorescent pink is printed in fluorescent pink and green inks. Specifically, a patch P211 is printed in fluorescent pink ink whose applying amount is 0% and in green ink whose applying amount is 80%, a patch P212 is printed in fluorescent pink ink whose applying amount is 20% and in green ink whose applying amount is 80%, and a patch P213 is printed in fluorescent pink ink whose applying amount is 120% and in green ink whose applying amount is 80%.

<About Execution of Calibration>

Figure 3A:
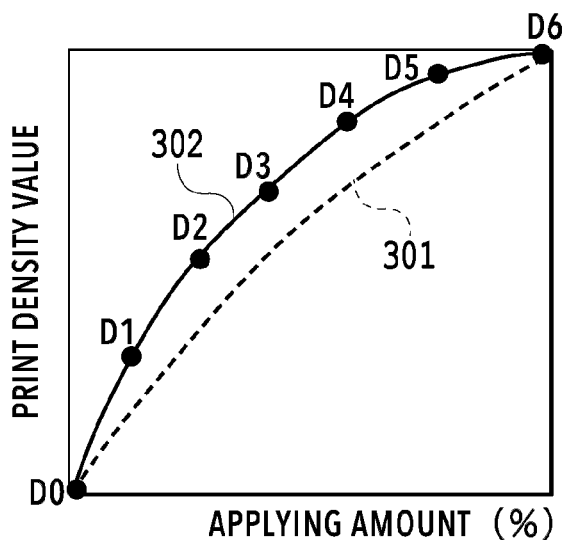
FIG. 3A to FIG. 3C are diagrams explaining 1D-LUT data.

FIG. 3A is a diagram for explaining 1D-LUT data that is used in the calibration processing unit 107 in FIG. 1. FIG. 3A shows an example by one ink type of a certain medium and the vertical axis represents the print density value of the printing unit, which is read by a sensor, and the horizontal axis represents the applying amount (%) in a case where a patch is printed.

The applying amount refers to a ratio of the number of ink dots to be printed on the paper surface. Here, explanation is given by taking an ink jet printer whose resolution is 1,200 dpi×1,200 dpi as an example of the printing apparatus. In a case where the area in which one dot of 1,200 dpi×1,200 dpi is printed is defined as one grid, 100% refers to the state where one dot is printed at all the plurality of grids. Further, 200% refers to the state where two dots are printed at each grid for all the grids of 1,200 dpi×1,200 dpi (state where the number of dots double that of 100% is printed). The position at which a dot is printed does not necessarily need to be the center of the grid and a dot may be printed between dots.

The density value in a case where the applying amount is X % can be defined as $$D(X) = -\log(P(X)/P(0)) \quad \text{formula 1}$$

by taking the reflectance coefficient that is output by a sensor to be P (X). Here, P (0) is the reflection coefficient of the patch in the paper white area.

Further, in a case where printing is performed in ink mixed with ink whose applying amount is C %, a predetermined constant, the density value can be defined as $$D(X) = -\log(P(X)/P(C)) \quad \text{formula 2}$$

Here, P (C) is the reflection coefficient of ink whose applying amount is C %, a predetermined constant.

Figure 3B:
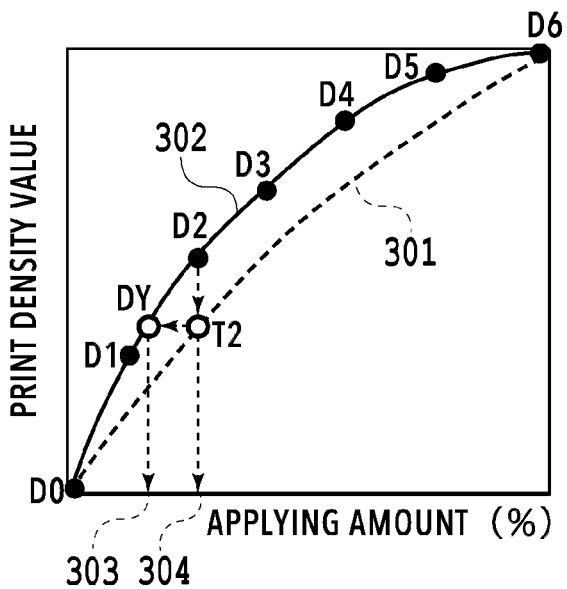

A curve indicated by a broken line 301 in FIG. 3B and the like indicates the print density value of the color material in the reference apparatus for the input data value, indicating the calibration target value. The reference apparatus is the printer that serves as a reference and refers to the printer whose volume of discharge is located at the center of the variation of the amounts of discharge of the actual apparatuses. The information relating to the calibration target value such as this is stored in advance in the storage unit of each printer within the system.

Further, a curve indicated by a solid line 302 indicates the print density values of the color material of the actual apparatus. The actual apparatus refers to the printer that performs calibration. This information is obtained by printing the patch chart in FIG. 2 and reading the printed patch chart with a sensor. D0 to D6 each indicate the density (calculated by formula 1) corresponding to each patch at an interval of 20% from 0% to 120% of the patch chart. The solid line 302 is derived by using interpolation processing, an approximate curve and the like based on the measured values of D0 to D6.

As shown in the printed state of the actual apparatus in FIG. 3A, on the whole, the volume of discharge of the color material of the actual apparatus is larger than that of the reference apparatus and in particular, in the intermediate density area, printing is performed more densely than the reference apparatus. The correction in the calibration processing unit 107 is to convert and correct the contone color material signal for each color material color so that the print density becomes the print density of the reference apparatus and the calibration processing unit 107 performs correction processing by using the correction parameter. Calculation of this correction parameter is explained by using FIG. 3B.

The plot point D2 in FIG. 3B indicates the density value in a case where the patch whose applying amount is 40% in the patch chart in FIG. 2 is printed by the actual apparatus. This value is higher than the target density value indicated by a plot point T2 corresponding to the same applying amount. Consequently, it is necessary to match the density value of the actual apparatus with the target density value by reducing the applying amount. Specifically, a point DY at which the density value at T2 corresponds to the applying amount of the actual apparatus is found by searching the points on the solid line 302. That is, in a case where the actual apparatus is used, on a condition that printing is performed with an applying amount 303 indicated by the point DY, the print density value becomes substantially equal to the target density value.

Figure 3C:
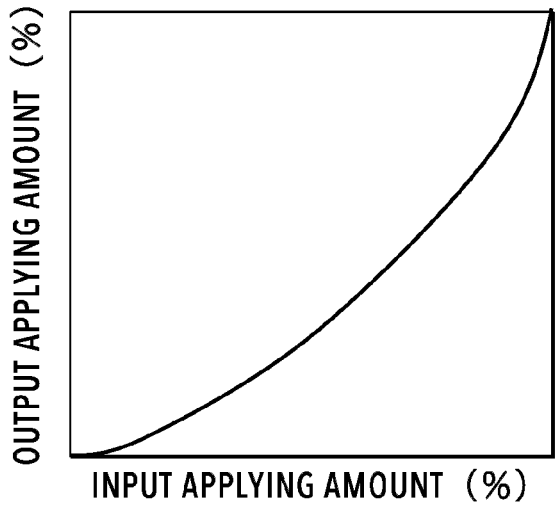

After performing the processing for the plot point D2 described previously for all the plot points D0 to D6, interpolation processing, an approximate curve and the like are used. Due to this, it is possible to generate 1D-LUT data, which is a relationship of the applying amount (%) of the output with respect to the applying amount (%) of the input as shown in FIG. 3C. The 1D-LUT is correction parameters of a mathematical formula and the like that can be defined by discrete values, such as 256 points or 1,024 points, or a curve.

<About Configuration of Printing System>

Figure 4:
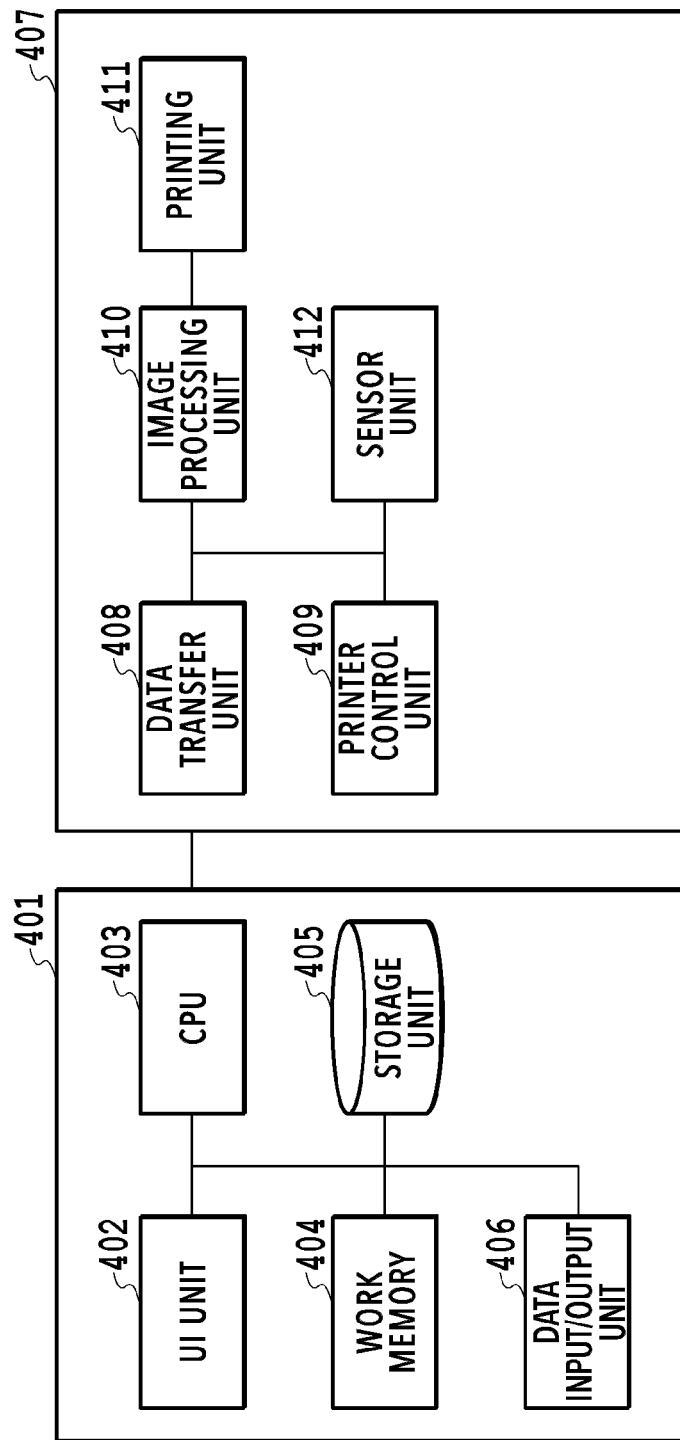
FIG. 4 is a configuration diagram of a printing system.

FIG. 4 is a block diagram showing the configuration of a printing system in the present embodiment. The printing system has a personal computer (in the following, also referred to simply as "PC") 401 as an information processing apparatus and a printer 407 as a printing apparatus. The PC 401 and the printer 407 are connected via a network and an interface, such as USB and a local bus.

The PC 401 performs processing relating to the control of the printer 407 as explained in the following in accordance with various software programs. In a storage unit 405, system programs, application software programs, software programs necessary for the printing operation, and software programs necessary for processing, to be explained in the following, are stored. Further, in the storage unit 405, various image processing parameters, mechanism parameters, printer control data and sensor unit control data, and necessary programs, various kinds of data, and printing-target data created on the PC 401 are stored. The storage unit 405 is represented by a hard disk and a flash ROM. A CPU 403 performs predetermined processing by using a work area of a work memory 404 in accordance with various programs and various kinds of data stored in the storage unit 405.

A data input/output unit 406 is a portable storage device represented by a CD, DVD, USB memory and the like, or a data communication device represented by a LAN card and used as an interface with the outside.

A user interface (in the following, also referred to as "UI") unit 402, which is an operation unit for a user, performs processing relating to the input by a user and the output (display and the like) to a user and includes an input device, such as a keyboard and a mouse, and a display device, such as a display.

The printer 407 has a data transfer unit 408, a printer control unit 409, an image processing unit 410, a printing unit 411, and a sensor unit 412 and performs printing processing based on print data sent from the PC 401. In this print data, control data of the sensor unit 412 is also included and the printer 407 performs measurement of a printed material by using the control data. The data transfer unit 408 extracts image data and image processing parameters from the print data sent from the PC 401 and sends them to the image processing unit 410, and extracts mechanism parameters, printer control data, and sensor unit control data and sends them to the printer control unit 409. Further, the data transfer unit 408 reads information relating to results of printing, sensor measurement and the like, which is stored in the storage unit within the printer, from the storage unit and sends the read information to the PC 401. The printer control unit 409 includes a CPU, a ROM, a RAM and the like and controls the printing operation of the printer 407 in accordance with the printer control data sent from the data transfer unit 408. Further, the printer control unit 409 performs control of measurement by the sensor unit 412 as well as control of the printing operation.

<About Color Sensor>

Figure 5:
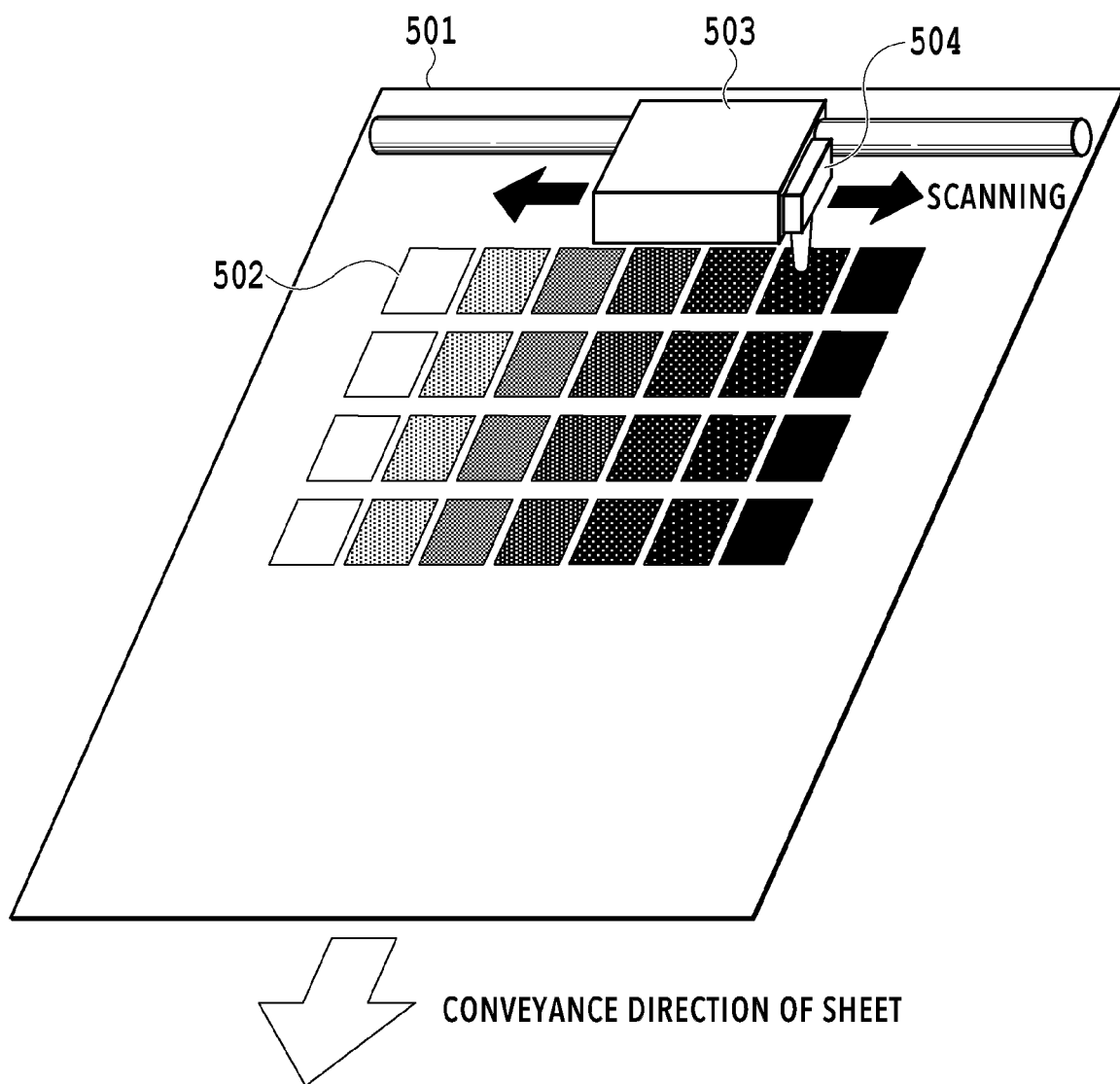
FIG. 5 is a diagram showing reading of a patch chart by a sensor unit.

FIG. 5 shows a configuration example of the sensor unit 412 in the printer 407. A carriage 503 forms a patch image 502 by discharging ink while scanning to left and right on a sheet 501. On the side surface of the carriage 503, a sensor member 504 is mounted.

<About Light Source LED of Color Sensor>

Figure 6A:
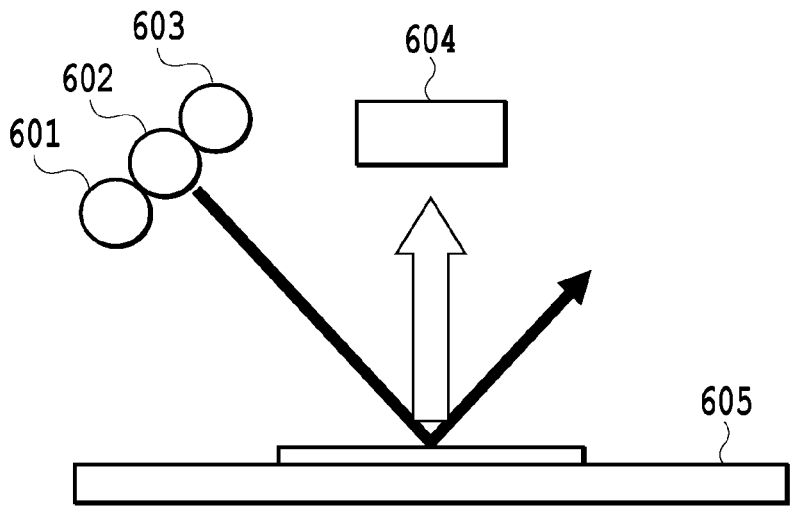
FIG. 6A and FIG. 6B are diagrams explaining the sensor unit.

FIG. 6A shows an outline configuration of the sensor unit. The sensor unit has a red LED 601, a green LED 602, a blue LED 603, and a light-receiving element 604. Light is emitted from the red LED 601, the green LED 602, and the blue LED 603 and light reflected from a printed material 605 is received by the light-receiving element 604. As the color of light emitted from the LED, the color of the complementary color whose density identification range is wide is selected depending on the color material that is measured. That is, measurement is performed by selecting the red LED for cyan and green, the green LED for magenta, fluorescent pink, and black, and the blue LED for yellow. The red LED is also called a red LED, the green LED is also called a green LED, and the blue LED is also called a blue LED.

Figure 6B:
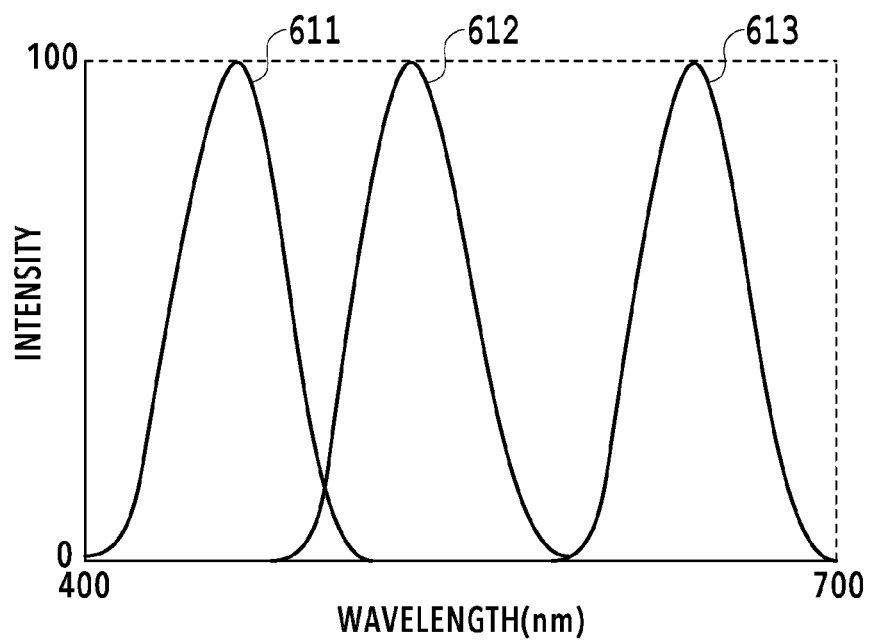

FIG. 6B shows a spectral intensity distribution as the spectral light emission characteristic of each LED. Symbol 611 indicates the spectral intensity distribution of the blue LED, symbol 612 indicates the spectral intensity distribution of the green LED, and symbol 613 indicates the spectral intensity distribution of the red LED.

<About Characteristic of Fluorescent Ink and Subtractive Color Mixture Ink>

Figure 7:
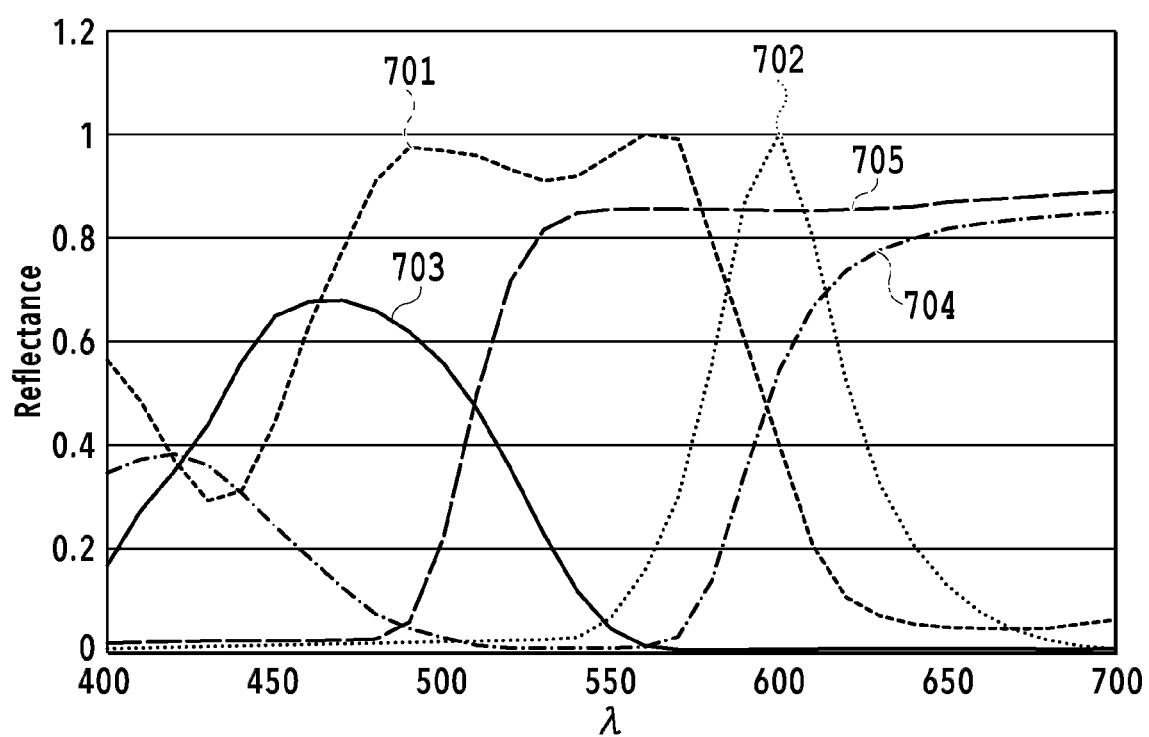
FIG. 7 is a diagram of activation wavelengths and light-emitting wavelengths of fluorescent ink and spectral reflectance of subtractive color mixture ink.

The fluorescent color material is a color material that develops a color by entering the activated state by absorbing light having the activation wavelength from the ground state and returning to the ground state by emitting light having the light-emitting wavelength. FIG. 7 shows the intensity of activation 701 and the intensity of light emission 702 in a case where printing is performed on the sheet surface in fluorescent pink ink and the horizontal axis represents the wavelength of light and the vertical axis represents the reflectance (intensity). The graph shown in FIG. 7 shows the intensity of light in a case where detection is performed by changing the wavelength of light that is cast to a printed sample and the wavelength of light that is received from the sample, respectively.

The light emission 702 indicates the intensity of light received from the printed sample for each wavelength in a case where the printed sample is irradiated with light having the wavelength causing activation. FIG. 7 shows the graph in a case where the printed sample is irradiated with light having a wavelength of 480 nm for the fluorescent pink in the present embodiment.

The activation 701 indicates the intensity of received light in a case where the wavelength of light to be received is fixed and the wavelength of light with which the printed sample is irradiated is changed. FIG. 7 shows the graph in a case where the wavelength of light to be received is fixed to 600 nm for the fluorescent pink in the present embodiment.

As is seen also from FIG. 7, the wavelength area in which the fluorescent ink discharged onto the sheet surface is activated is on the side of short wavelengths while overlapping the light-emitting wavelength area. Further, the activation 701 becomes strong or weak depending on the wavelength and has a wavelength at which light is emitted efficiently and a wavelength at which light is not emitted efficiently. Further, the fluorescent color material emits light, and therefore, in many cases the reflectance at the light-emitting wavelength exceeds 1. In the present embodiment, the color material having the characteristic as described above is defined as the fluorescent color material.

In the above, the activation and light emission of the fluorescent pink ink are explained, but it may also be possible to adopt fluorescent ink that emits light having another wavelength in the present embodiment. As the fluorescent ink such as this, mention is made of, for example, fluorescent blue that emits light in the blue area (from 450 nm to 500 nm) and fluorescent green that emits light in the green area (from 500 nm to 560 nm). Further, it may also be possible to adopt fluorescent yellow that emits light in the yellow area (from 565 nm to 590 nm), fluorescent orange or fluorescent red that emits light in the red area (from 590 nm to 780 nm). Furthermore, it may also be possible to adopt fluorescent ink obtained by combining the fluorescent inks described previously. Still furthermore, it may also be possible to combine fluorescent inks whose intensity of the wavelength causing activation is different and adjust the color tone. For example, mention is made of fluorescent pink whose activation in the blue area is weak, whose activation in the green area is strong, and which emits light in the orange area.

In the present embodiment, the subtractive color mixture ink is defined as ink containing a color material that absorbs light having a specific wavelength and does not emit the light among cast light. For example, the subtractive color mixture ink refers to the basic color ink, such as cyan, magenta, and yellow. The spectral reflectance of the subtractive color mixture ink is the spectral reflectance, such as that of cyan (C) 703, magenta (M) 704, and yellow (Y) 705 in FIG. 7. Different from the fluorescent ink, the reflectance of the subtractive color mixture ink does not exceed 1 because the subtractive color mixture ink only absorbs light.

<About Fluorescent Ink>

Next, the fluorescent ink that is used in the present embodiment is explained. In the present embodiment, fluorescent ink created by mixing a dispersion having the fluorescent characteristic, a solvent, and an activator. The fluorescent dispersion that is used in the present embodiment is a dispersion having the fluorescent characteristic. For example, mention is made of NKW-3207E (fluorescent pink water dispersion: NIHON KEIKOH KAGAKU), NKW-3205E (fluorescent yellow water dispersion: NIHON KEIKOH KAGAKU) and the like but any dispersion having the fluorescent characteristic may be used.

Ink is produced by combining a known solvent and a known activator with the above-described fluorescent dispersion and dispersing the fluorescent dispersion. The dispersion method of the fluorescent dispersion is not limited in particular. For example, it is possible to use the fluorescent dispersion obtained by dispersion with a surfactant, the resin-dispersed fluorescent dispersion obtained by dispersion with a dispersion resin, and the like. Of course, it is also possible to use a combination of fluorescent dispersions whose dispersion methods are different. As the surfactant, it is possible to use anionic, nonionic, cationic, and bionic activators. As the dispersion resin, it is possible to use any resin having water solubility or water dispersiveness, but among others, a dispersion resin whose weight-average molecular weight is not less than 1,000 and not more than 100,000, and further, not less than 3,000 and not more than 50,000 is preferably. As the solvent, it is preferable to use, for example, a water solvent containing water or a water soluble organic solvent.

<About Printing Medium>

In the present embodiment, the printing medium (also referred to as printed medium) onto which ink is discharged has a substrate and at least one ink-receiving layer. As the printing medium, an ink jet printing medium used for the ink jet image printing method is preferable.

(Surface Roughness of Printing Medium)

It is sufficient to appropriately adjust the surface roughness of a printing medium in accordance with the degree of gloss required for the printing medium. As the method of adjusting the surface roughness of a printing medium, mention is made of, for example, a method in which concavities and convexities are provided by pressing the surface of the substrate or the like of a printing medium with a roll having specific concavities and convexities and the surface of the concavities and convexities is coated with an ink-receiving layer coating liquid. Further, mention is made of a method in which after an ink-receiving layer is formed by coating an ink-receiving layer coating liquid, a roll having specific concavities and convexities is pressed against the ink-receiving layer surface and thereby concavities and convexities are provided. Furthermore, it may also be possible to control the surface roughness in accordance with the particle diameter of inorganic particles that are to be contained in the ink-receiving layer, control the surface roughness by further providing a layer including inorganic particles on the surface of the ink-receiving layer and based on the particle diameter of the inorganic particle in the layer and the coverage of the layer, and so on. In the following, the preferable surface roughness of the representative printing media is described.

(1) Glossy Paper

In a case where glossy paper is used as a printing medium, arithmetic average roughness Ra of the surface of the printing medium, which is specified by JIS B 0601: 2001, is preferably 0.13 m or less. More preferably, Ra is not less than 0.05 m and not more than 0.13 m and particularly preferably, Ra is not less than 0.10 m and not more than 0.13 m.

(2) Mat Paper

In a case where mat paper is used as a printing medium, the arithmetic average roughness Ra of the surface of the printing medium, which is specified by JIS B 0601: 2001, is preferably not less than 1.0 m and not more than 10.0 m and more preferably, not less than 1.0 m and not more than 5.0 m. Further, in a case where mat paper is used as a printing medium, a root-mean-square slope RΔq of a roughness curve element of the surface of the printing medium, which is specified by JIS B 0601: 2001, is preferably 0.3 m or more, and more preferably, 0.5 m or more.

<About Patch Printing and Measurement>

In the present embodiment, reading of a patch by the color sensor shown in FIG. 6A is performed.

First, an example of reading of a magenta halftone patch is described. FIG. 8A shows an ink spectral reflectance that is obtained by measuring a magenta patch printed on the paper surface by a spectral colorimeter. In each diagram in FIG. 8A to FIG. 8E, the horizontal axis represents the wavelength k and the vertical axis represents the reflectance Reflectance. Symbol 801 in FIG. 8A indicates the reflectance of paper white and symbols 802 to 807 each indicate the reflectance of the calibration patch in a case where the applying amount is changed at an interval of 20%.

As described previously, the color sensor of the present embodiment irradiates one of the LEDs of R, G, and B with light and receives light in the visible light area (400 to 700 nm) and in a case where the magenta patch is measured, the color sensor irradiates the green LED with light. The change in reflectance in a case where the amount of magenta ink is changed is large in the vicinity of 540 nm, and therefore, the use of the green LED as the LED that is irradiated with light enables efficient detection of the change in ink amount with the sensor. Symbol 905 in FIG. 9A shows an example of results of measuring seven patches printed in magenta ink with the color sensor.

As shown in FIG. 6B, each LED has a bandwidth of predetermined wavelengths. For example, the green LED has the light emission spectrum in the wavelength area in the vicinity of 500 to 600 nm and as shown in FIG. 6A, reflected light of irradiated light is received with the sensor. In a case of subtractive color mixture ink, an increase in ink amount reduces reflected light, and therefore, the output value (reflection coefficient) of the sensor is reduced. Based on this amount of reduction, the change in volume of discharge is estimated. Specifically, the target density and the density of the actual apparatus, which is calculated by formula 1 or formula 2 using the output value (reflection coefficient) of the sensor, are compared. Then, in a case where the density of the actual apparatus is lower than the target density, it is estimated that the volume of discharge of the actual apparatus is smaller than the volume of discharge of the reference apparatus. On the other hand, in a case where the density of the actual apparatus is higher than the target density, it is estimated that the volume of discharge of the actual apparatus is larger than the volume of discharge of the reference apparatus.

Figure 9A:
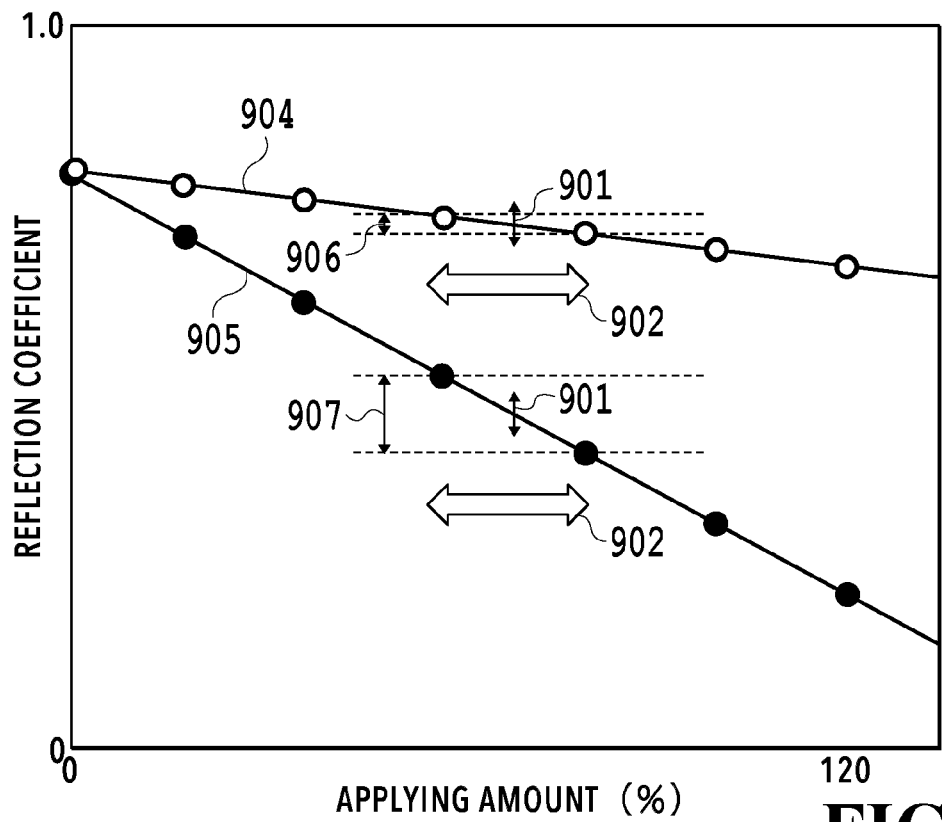
FIG. 9A and FIG. 9B are each a diagram showing results of measuring a halftone patch for calibration with a color sensor.

Here, FIG. 9A is referred to. Symbol 905 in FIG. 9A indicates a relationship between the applying amount of magenta ink and the reflection coefficient calculated in accordance with formula 1. In the relationship indicated by symbol 905, for a difference in volume of discharge 902 (=20%) desired to be corrected by color calibration, a difference in refection coefficient 907 (=0.2) is sufficiently larger than a reading error 901 (=0.1) of the sensor, and therefore, the error can be ignored. Consequently, it is possible to highly accurately detect the difference in volume of discharge desired to be corrected with the sensor. To be strict, the difference in volume of discharge and the difference in applying amount are different, but here, the difference in volume of discharge is approximated as the difference in applying amount and in the following, the same applies.

Next, an example of reading of a fluorescent pink halftone patch is described. FIG. 8B shows an ink spectral reflectance that is obtained by measuring a patch printed on the paper surface only in fluorescent pink ink by a spectral colorimeter. Symbol 811 in FIG. 8B indicates the reflectance of paper white and symbols 812 to 817 each indicate the spectral reflectance of the calibration patch in a case where the applying amount is changed at an interval of 20%.

In a case where measurement is performed with the color sensor, the change in reflectance is large in the vicinity of 540 nm as in the case of magenta, and therefore, the green LED is irradiated with light. However, as regards the fluorescent pink ink, as shown in FIG. 8B, in a case where the ink amount increases, the reflectance in the vicinity of $\lambda=540$ nm reduces and on the other hand, light emission occurs due to fluorescence in the vicinity of $\lambda=600$ nm. Because of that, compared to a case where there is no light emission due to fluorescence, the amount of light received by the sensor increases accompanying an increase in ink amount.

Because of that, as shown in the example of the results of measuring the seven fluorescent pink patches with the color sensor indicated by symbol 904 in FIG. 9A, the slope of the relationship between the applying amount of the fluorescent pink ink and the reflection coefficient calculated in accordance with formula 1 becomes gradual compared to that of magenta (symbol 905 in FIG. 9A). As a result of that, for a difference in reflection coefficient 906 (=0.05) corresponding to the difference in volume of discharge 902 (=20%) desired to be corrected by color calibration, the correction error (=0.1) of the color sensor becomes large, and therefore, it is not possible to detect the difference in volume of discharge with a high accuracy.

Next, a case is described where printing is performed by mixing fluorescent pin ink specified by the fluorescent pink halftone patch with green ink whose applying amount is 80%. In "printing by mixing inks" in the present embodiment, both inks are discharged from separate discharge ports, but applied so that both inks exist in a mixed manner in the same area on the paper surface. FIG. 8D shows an example of the spectral reflectance of the fluorescent ink halftone patch in a case where the applying amount of green ink is 80%. Symbol 831 in FIG. 8D indicates, as in the case of symbol 821 in FIG. 8C, the spectral reflectance of the calibration patch of green ink whose applying amount is 80%. Further, symbols 832 to 837 each indicate the spectral reflectance of the calibration patch in a case where the applying amount of fluorescent pink ink is changed at an interval of 20% for green ink whose applying amount is 80%. The applying amount 80% of green ink is an example of a value with which the paper surface is covered with ink in view of bleed of ink discharged onto the sheet as well and this not limited depending on the sheet and ink. The optimum applying amount is determined by using a conditional formula to be described in <About selection of subtractive color mixture ink at the time of patch printing> to be described later.

Figure 10A:
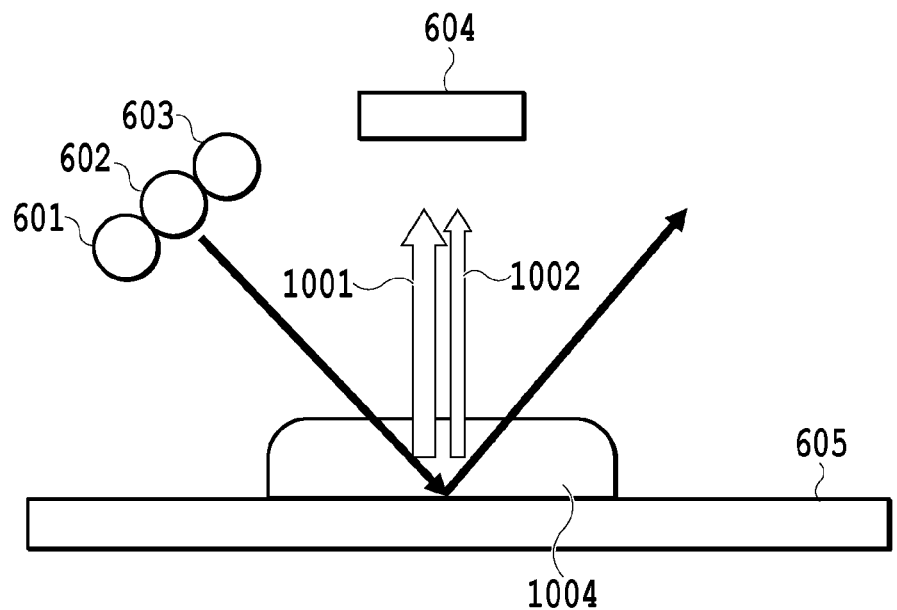
FIG. 10A and FIG. 10B are each a diagram schematically showing a relationship between reflected light and emitted light due to fluorescence in a case where ink discharged onto a sheet is measured with a color sensor.
Figure 10B:
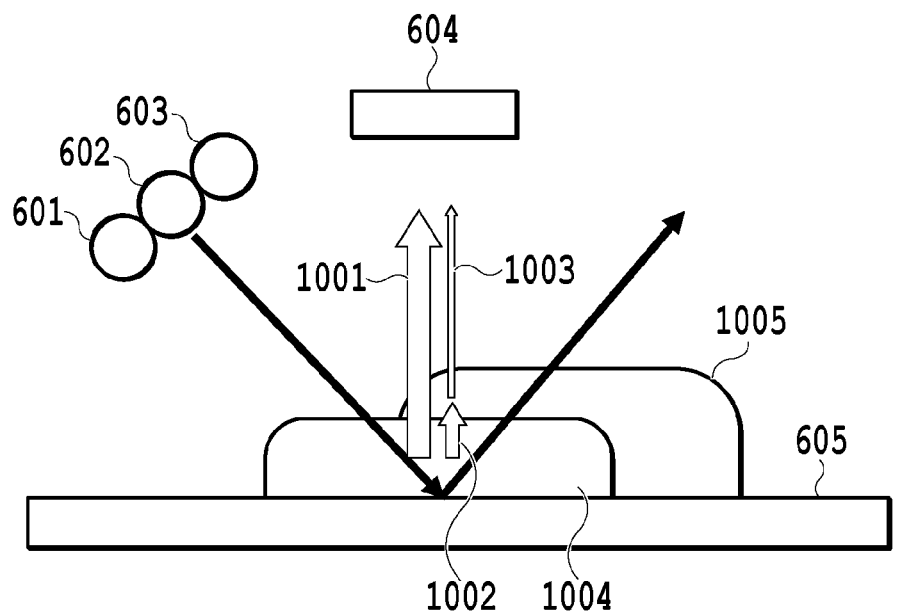

FIG. 10A and FIG. 10B are each a diagram for explaining measurement of a printed material by the sensor unit shown in FIG. 6A. In detail, FIG. 10A shows a case where printing is performed only in fluorescent pink ink and FIG. 10B shows a case where printing is performed by mixing fluorescent pink ink with green ink, which is subtractive color mixture ink.

To explain the case of FIG. 10A, as described previously, fluorescent pink ink 1004 absorbs incident light and reflects light (indicated by arrow 1001) in the wavelength area, which is not absorbed, and further, emitted light (indicated by arrow 1002) of the fluorescent pink ink 1004 is added.

Figure 9B:
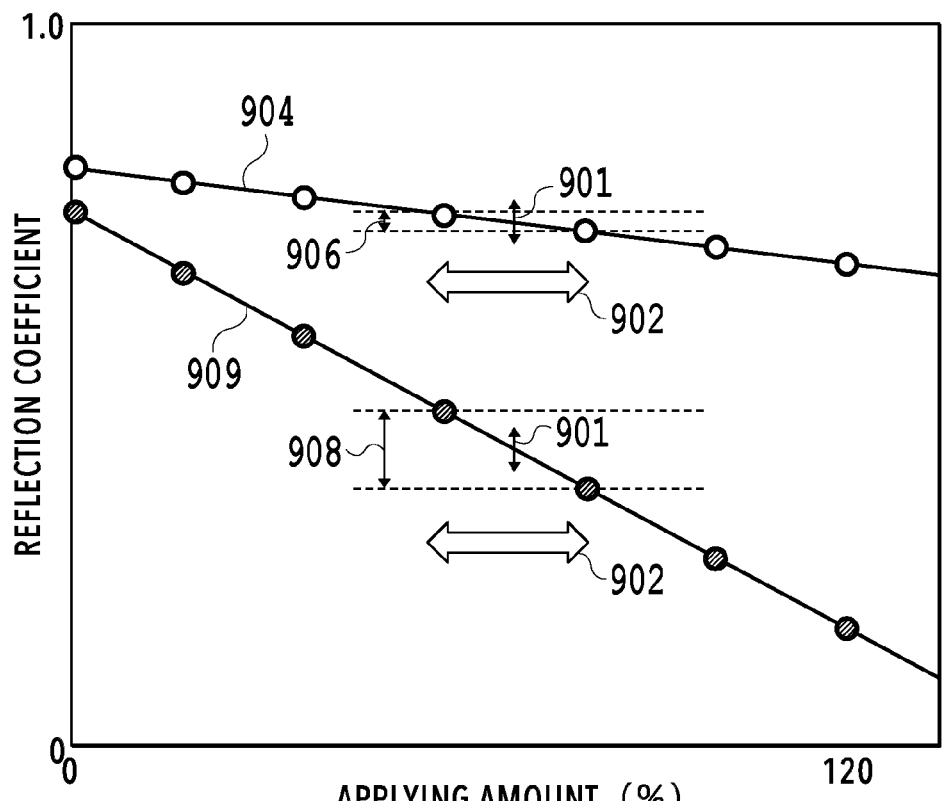

On the other hand, as shown in FIG. 10B, in a case where printing is performed by mixing fluorescent pink ink with green ink, at the time of light (indicated by arrow 1002) emitted from the fluorescent pink ink 1004 passing a green ink layer 1005, the light is absorbed by the green ink. As a result of that, the amount of light to be radiated reduces (indicated by arrow 1003). Because of that, compared to a case (symbol 904 in FIG. 9B) where printing is performed without mixing green ink, in a case where printing is performed by mixing green ink, as indicated by symbol 909 in FIG. 9B, the slope of the relationship between the applying amount and the reflection coefficient calculated by formula 2 becomes steep.

As a result of that, a difference in reflection coefficient 908 (=0.2) corresponding to the difference in volume of discharge 902 (=20%) desired to be corrected by color calibration becomes larger than the difference in correction error 901 (=0.1) of the color sensor, and therefore, it is possible to detect the difference in volume of discharge with a high accuracy. In the present embodiment, in a case where printing is performed by mixing green ink, at least one green ink dot covers the fluorescent pink ink dot. For example, by controlling the order of applying each ink to the same area so that green ink is applied to the position to which fluorescent pink ink is applied, it is possible to cause the green ink dot to cover the fluorescent pink ink dot. Further, it is possible to cause the green ink dot to cover the fluorescent pink ink dot to a desired degree by adjusting the applying amount at timing of application of each ink.

Further, as described previously, in order to cause light having an activation wavelength to be absorbed, it is necessary to apply green ink until the coverage on the paper surface becomes a predetermined percentage (in this example, 80%) or higher. Further, in order to avoid the influence by the variation in volume of discharge of green ink, in a case where calculation is performed in accordance with formula 2, it is better to handle the reading value of the patch printed by each actual apparatus only in green ink whose applying amount is 80% as P (C).

Next, an example of a case where printing is performed by mixing yellow ink in place of green ink is described. FIG. 8E shows the spectral reflectance in a case where printing is performed by mixing fluorescent pink ink with yellow ink. Symbol 841 in FIG. 8E shows the spectral reflectance of the calibration patch of yellow ink whose applying amount is 80%. Further, symbols 842 to 847 each indicate the spectral reflectance of the calibration patch in a case where the applying amount of fluorescent pink ink is changed at an interval of 20% for yellow ink whose applying amount is 80%.

As shown in FIG. 8E, as regards yellow ink, there is an effect of absorbing the activation wavelength, but it is not possible to absorb the light-emitting wavelength. Specifically, it is not possible to suppress the reflected light due to the light emission in the vicinity of 600 nm, and therefore, the effect by yellow ink is not sufficient.

From the above, in a case where the wavelength at the point at which the spectral reflectance of fluorescent ink and the spectral reflectance of paper white intersect is defined as "reference wavelength", subtractive color mixture ink with which fluorescent ink is mixed in printing is characterized in that the reflectance on the side of wavelengths longer than the reference wavelength is relatively lower than the reflectance on the side of shorter wavelengths. In the explanation described previously, as ink that is mixed in printing, green ink is used, but as long as this characteristic is satisfied, another ink, such as cyan ink, may be used.

<About Selection of Subtractive Color Mixture Ink at the Time of Patch Printing>

In the following, conditions that should be satisfied by subtractive color mixture ink in the present embodiment are explained.

In a case where the reflection spectrum is taken to be S ($\lambda$), the light emission spectrum is taken to be $\alpha$ ($\lambda$), the activation spectrum is taken to be $\beta$ ($\lambda$), and the light source spectrum is taken to be E ($\lambda$), intensity Y of light at a certain wavelength ($\lambda$) in fluorescent ink can be defined as formula 3 below.

$$Y(\lambda)_{fluorescence} = S(\lambda)E(\lambda) + \alpha(\lambda)\int_\lambda \beta(\lambda_{activation}) E(\lambda_{activation}) d\lambda_{activation} \quad \text{formula 3}$$

(the origin of source is Journal of the Imaging Society of Japan, 2018, vol. 57, No. 2, pp. 207-213)

Here, in formula 3, a is 400 nm to 700 nm. Further, $\lambda_{activation}$ is the activation wavelength of fluorescent ink and for fluorescent pink ink that is used in the present embodiment, $\lambda_{activation}$ is 400 nm to 630 nm.

On the other hand, the intensity of light at the certain wavelength k in subtractive color mixture ink can be defined as formula 4 below because there is no light emission due to fluorescence.

$$Y(\lambda)_{subtractive} = S(\lambda)E(\lambda) \quad \text{formula 4}$$

Then, the intensity of light of fluorescent ink whose volume of discharge (described as Vd) is small is taken to be $Y(\lambda)_{fluorescence\ Vd\ small}$, and the intensity of light of fluorescent ink whose volume of discharge is large is taken to be $Y(\lambda)_{fluorescence\ Vd\ large}$. Then, it is assumed that the amount of light of the secondary color of fluorescent ink and subtractive color mixture ink is $Y(\lambda)_{fluorescence} \times Y(\lambda)_{subtractive}$. Then, in a case where the interval of n of $\Sigma$ is taken to be 10 from 400 to 700 of $\lambda$, the intensity of light received by the sensor can be defined as formula 5 below.

$$\sum_n (Y(\lambda)_{fluorescence} \times Y(\lambda)_{subtractive}) \quad \text{formula 5}$$

Because of this, the subtractive color mixture ink needs to be one that satisfies the following condition, formula 6, for Vd large–Vd small (=20%), which is the difference in volume of discharge, desired to be corrected by calibration as described previously.

$$\text{sensor reading error} < |\Sigma_n(Y(\lambda)_{fluorescence\ Vd\ small} \times Y(\lambda)_{subtractive}) - \Sigma_n(Y(\lambda)_{fluorescence\ Vd\ large} \times Y(\lambda)_{subtractive})| \quad \text{formula 6}$$

From among the subtractive color mixture inks mounted in the printer so as to satisfy the above conditions, the optimum ink type is selected and the optimum applying amount is found by changing the applying amount of the selected ink type.

<About Process of Calibration Processing>

Figure 12B:
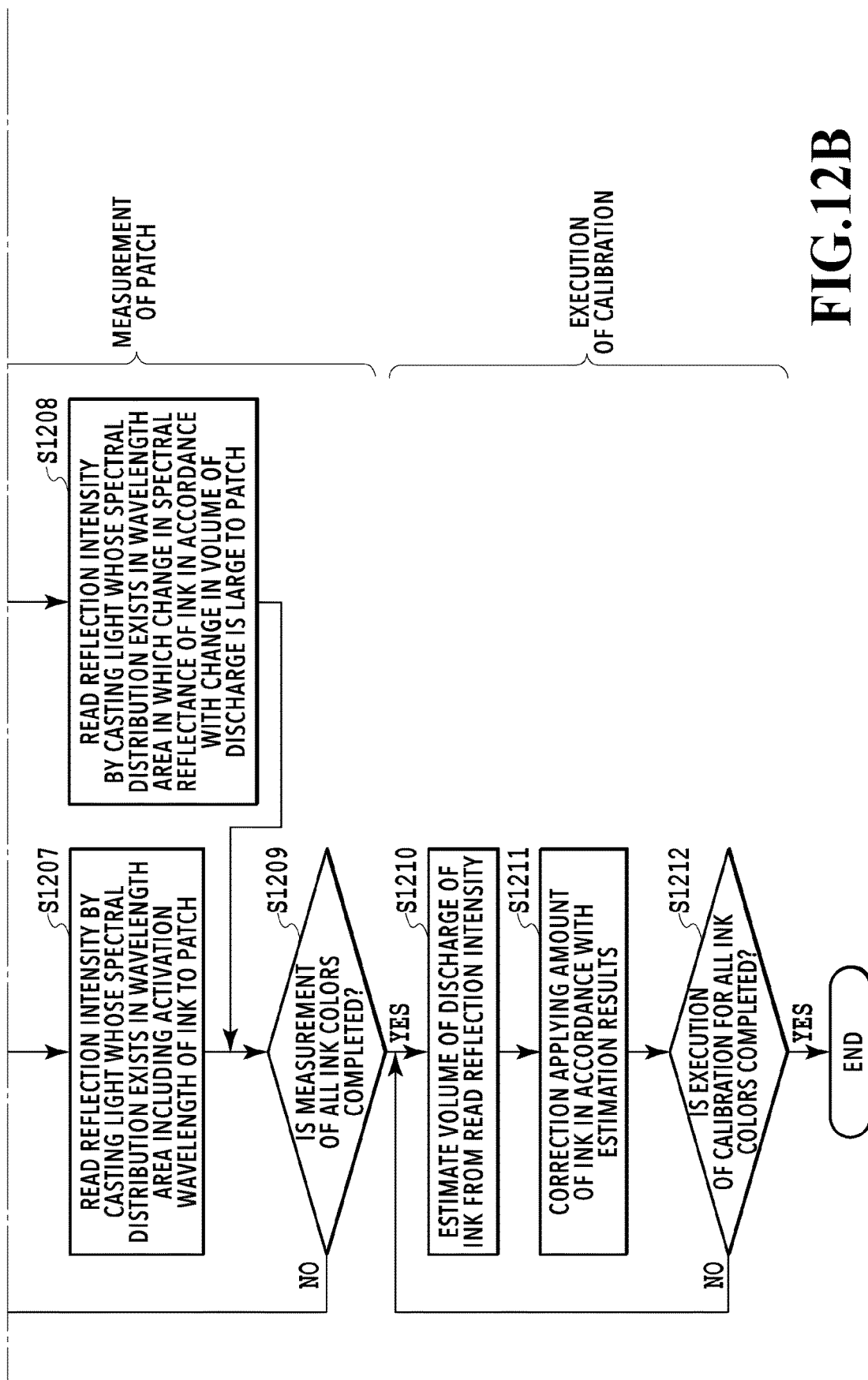

In the following, the process of the calibration processing in the present embodiment is explained by using FIG. 12A and FIG. 12B. Each piece of the calibration processing is performed by the CPU 403 or the like in accordance with a calibration processing program stored in the storage unit 405 (see FIG. 4). Parameters necessary for the calibration processing are input by a user via the UI unit 402.

First, the process (step S1201 to step S1205) to print the calibration patch chart shown in FIG. 2 is explained. First, at S1201, the CPU 403 determines whether the creation-target patch is a patch of fluorescent ink. In a case where determination results at this step are affirmative, the processing advances to step S1202. On the other hand, in a case where the determination results at this step are negative, the processing advances to S1203. In the following, "step S-" is abbreviated to "S-".

At S1202, the CPU 403 creates patch image data for estimating the volume of discharge, with which subtractive color mixture ink whose reflectance of the activation wavelength of fluorescent ink is high and whose reflectance in the light-emitting wavelength area of fluorescent ink is low is mixed. Specifically, subtractive color mixture with which fluorescent ink is mixed in printing is selected by the method described in <About selection of subtractive color mixture ink at the time of printing> described previously.

At S1203, the CPU 403 creates patch image data for estimating the volume of discharge, in which the applying amount is changed at an interval of 20% from 0% to 120%. In the present embodiment, the patch in which the applying amount of ink is changed at an interval of 20% from 0% to 120% is used, but the interval may be another predetermined interval other than 20%. Further, the minimum applying amount may be other than 0% and the maximum applying amount may be other than 120%.

At S1204, the CPU 403 determines whether the creation of the image data of the patch chart of all the creation-target ink colors (image data of the patch chart shown in FIG. 2) is completed. In a case where determination results at this step are affirmative, the processing advances to S1205 after storing the created image data of the patch chart in the storage unit 405. On the other hand, in a case where the determination results at this step are negative, the processing returns to S1201.

At s1205, the CPU 403 reads information relating to printing of a printing medium from the storage unit 405 and transmits the information to the printer 407. Further, the CPU 403 also reads the patch chart data (image data of the patch chart shown in FIG. 2) similarly from the storage unit 405 and transmits the patch chart data to the printer 407. This patch chart data is input to a halftoning processing unit (not shown schematically) next to the calibration processing unit 107 via the image signal I/F 101 (see FIG. 1) of the printer 407 and halftoning processing for the patch chart data is performed directly. After that, the printing unit 411 performs printing processing based on the patch chart data for which the halftoning processing has been performed.

In the present embodiment, the image data of the calibration patch chart is created in the flow of calibration processing, but it may also be possible not to create the image data in the flow of calibration processing. For example, it may also be possible to store patch chart data created in advance in the storage unit 405 and read and use the patch chart data in a case where calibration processing is performed.

Next, the process (S1206 to S1209) to measure each patch included in the printed patch chart is explained. First, at S1206, the printer control unit 409 determines whether the measurement-target patch is the patch of fluorescent ink. In a case where determination results at this step are affirmative, the processing advances to S1207. On the other hand, in a case where the determination results at this step are negative, the processing advances to S1208.

At S1207, the printer control unit 409 reads the reflection intensity with the sensor unit 412 by casting light whose spectral distribution exists in the wavelength area including the activation wavelength of ink to the patch. Specifically, the printer control unit 409 reads the reflection intensity of the patch by the method described in <About patch printing and measurement>.

At S1208, the printer control unit 409 reads the reflection intensity with the sensor unit 412 by casting light whose spectral distribution exists in the wavelength area in which the change in spectral reflectance of ink in accordance with the change in volume of discharge is large to the patch.

In the present embodiment, light with which the calibration patch is irradiated at the time of measurement of the calibration patch is selected in the flow of the calibration processing, but it may also be possible to perform measurement by using a condition relating to the irradiation light stored in advance in the storage unit 405.

At S1209, the printer control unit 409 determines whether the measurement of the patches of all the measurement-target ink colors is completed. In a case where determination results at this step are affirmative, the processing advances to S1210 to perform calibration. On the other hand, in a case where the determination results at this step are negative, the processing returns to S1206.

Next, the process (S1210 to S1212) to perform calibration actually is explained. First, at S1210, the printer control unit 409 estimates the volume of discharge based on the reflection intensity read by the patch measurement.

At S1211, the printer control unit 409 corrects the applying amount of ink based on estimation results at S1210. Specifically, the printer control unit 409 performs correction by the method described in <About execution of calibration> described previously and performs correction processing by using the 1D-LUT stored in the calibration processing unit 107. It may also be possible to perform correction processing based on the density value calculated from the read reflection intensity and the target density value without estimating the volume of discharge from the reflection intensity read by the patch measurement (that is, without performing S1210).

At S1212, the printer control unit 409 determines whether the execution of calibration for all the ink colors is completed. In a case where determination results at this step are affirmative, the series of processing is terminated. On the other hand, in a case where the determination results at this step are negative, the processing returns to S1210.

In the present embodiment, the tone correction processing unit 106 performs the processing by using a 1D-LUT different from the 1D-LUT used by the calibration processing unit 107. However, it may also be possible for the tone correction processing unit 106 and the calibration processing unit 107 to perform the processing by using one 1D-LUT obtained by combining these 1D-LUTs. Further, it may also be possible to generate 1D-LUT data in the image processing process shown in FIG. 1.

Effects of the Present Embodiment

According to the present embodiment, it is possible to implement, at a low cost, highly accurate color calibration in a printing apparatus that performs printing using fluorescent ink.

Second Embodiment

In the first embodiment, the aspect is explained in which the calibration patch chart is printed by mixing fluorescent ink and subtractive color mixture ink. In the present embodiment, the printing order of fluorescent ink and subtractive color mixture ink of the patch used for correction is changed in accordance with a printing medium. The reason is that there is a case where the light emission absorption efficiency of fluorescent ink is different in accordance with the printing order depending on a printing medium.

As the printing medium on which a patch is printed, mention is mainly made of mat paper whose surface roughness is large (that is, coarse) and glossy paper whose surface roughness is small (that is, smooth).

Figure 14A:
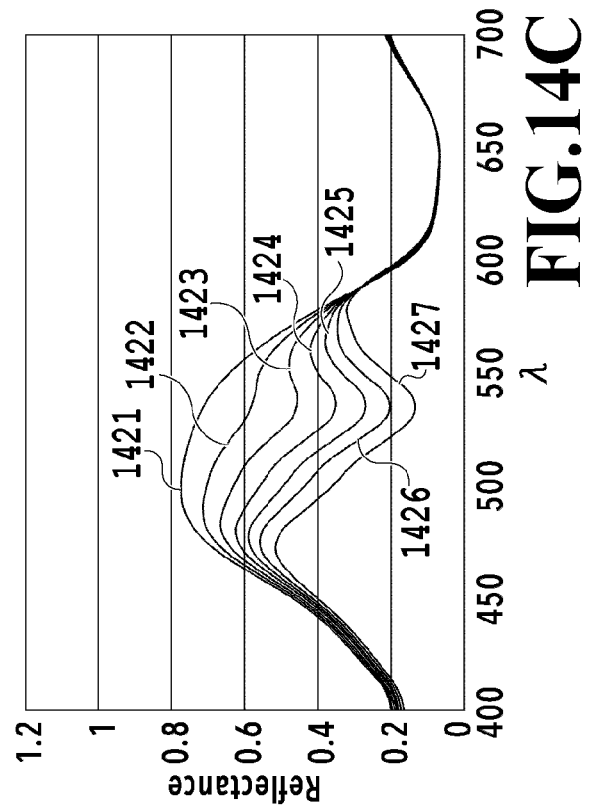
FIG. 14A to FIG. 14D are each a diagram of spectral reflectance.
Figure 14B:
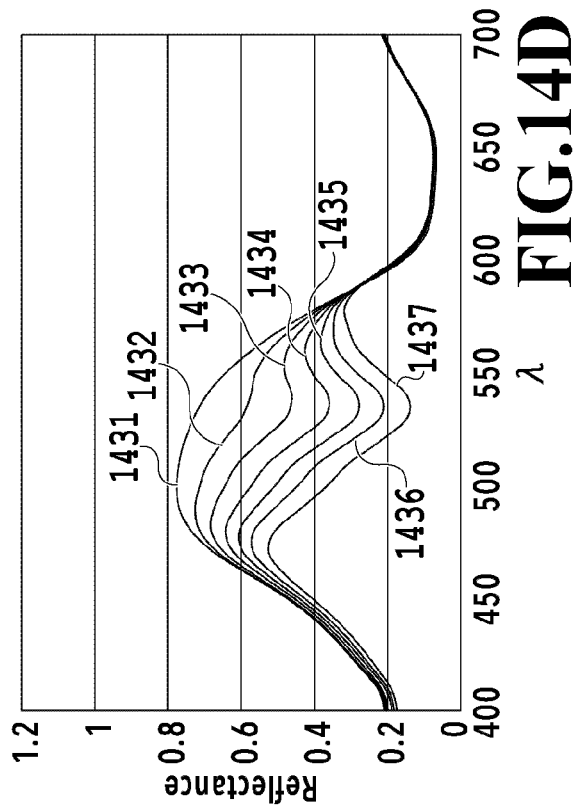

FIG. 14A and FIG. 14B show a case where a halftone patch is printed on mat paper.

FIG. 14A shows an example of the spectral reflectance in a case where green ink is not discharged after fluorescent pink ink at the time of printing a fluorescent pink halftone patch on mat paper by mixing fluorescent pink ink specified by the fluorescent pink halftone patch with green ink whose applying amount is 80%. In detail, symbol 1401 in FIG. 14A indicates the spectral reflectance of the calibration patch of the green ink whose applying amount is 80%. Further, symbols 1402 to 1407 each indicate the spectral reflectance of the calibration patch in a case where the applying amount of fluorescent pink ink is changed at an interval of 20% for the green ink whose applying amount is 80%.

Different from FIG. 14A, FIG. 14B shows an example of the spectral reflectance in a case where green ink is discharged after fluorescent pink ink at the time of printing the fluorescent pink halftone patch on mat paper by mixing fluorescent pink ink specified by the fluorescent pink halftone patch with green ink whose applying amount is 80%. In detail, symbol 1411 in FIG. 14B indicates the spectral reflectance of the calibration patch of green ink whose applying amount is 80%. Further, symbols 1412 to 1417 each indicate the spectral reflectance of the calibration patch in a case where the applying amount of fluorescent pink ink is changed at an interval of 20% for the green ink whose applying amount is 80%.

Figure 14C:
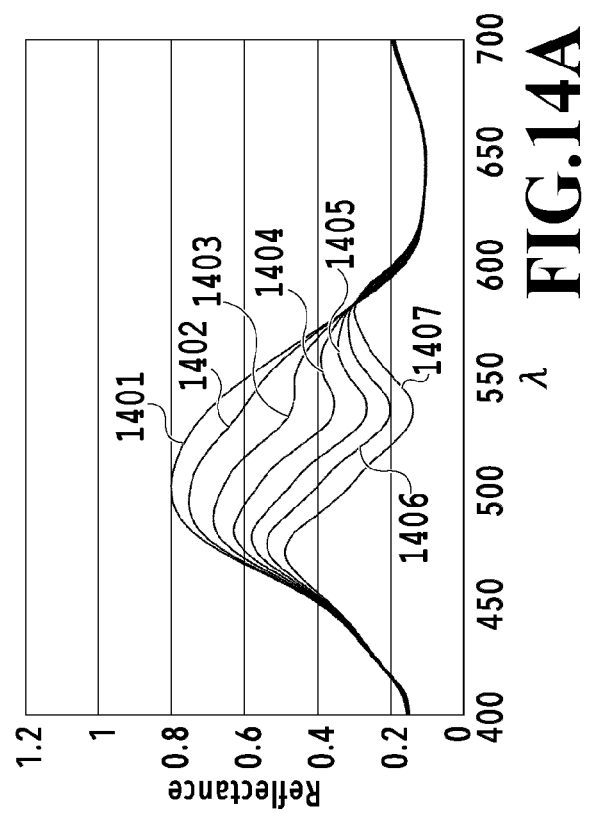
Figure 14D:
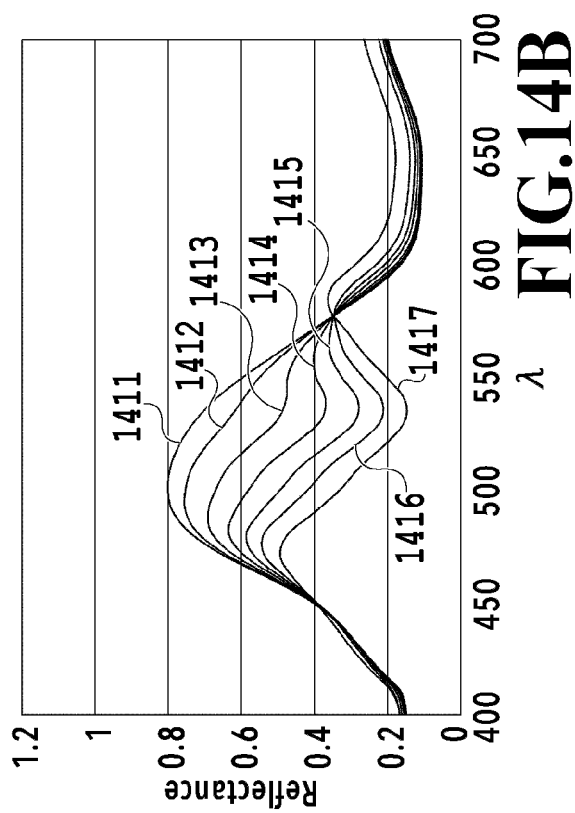

On the other hand, 14C and FIG. 14D show a case where a halftone patch is printed on glossy paper.

FIG. 14C shows an example of the spectral reflectance in a case where green ink is not discharged after fluorescent pink ink at the time of printing the fluorescent pink halftone patch on glossy paper by mixing fluorescent pink ink specified by the fluorescent pink halftone patch with green ink whose applying amount is 80%. In detail, symbol 1421 in FIG. 14C indicates the spectral reflectance of the calibration patch of green ink whose applying amount is 80%. Further, symbols 1422 to 1427 each indicate the spectral reflectance of the calibration patch in a case where the applying amount of fluorescent pink ink is changed at an interval of 20% for the green ink whose applying amount is 80%.

Different from FIG. 14C, FIG. 14D shows an example of the spectral reflectance in a case where green ink is discharged after fluorescent pink ink at the time of printing the fluorescent pink halftone patch on glossy paper by mixing fluorescent pink ink specified by the fluorescent pink halftone patch with green ink whose applying amount is 80%. In detail, symbol 1431 in FIG. 14D indicates the spectral reflectance of the calibration patch of green ink whose applying amount is 80%. Further, symbols 1432 to 1437 each indicate the spectral reflectance of the calibration patch in a case where the applying amount of fluorescent pink ink is changed at an interval of 20% for the green ink whose applying amount is 80%.

Figure 15A:
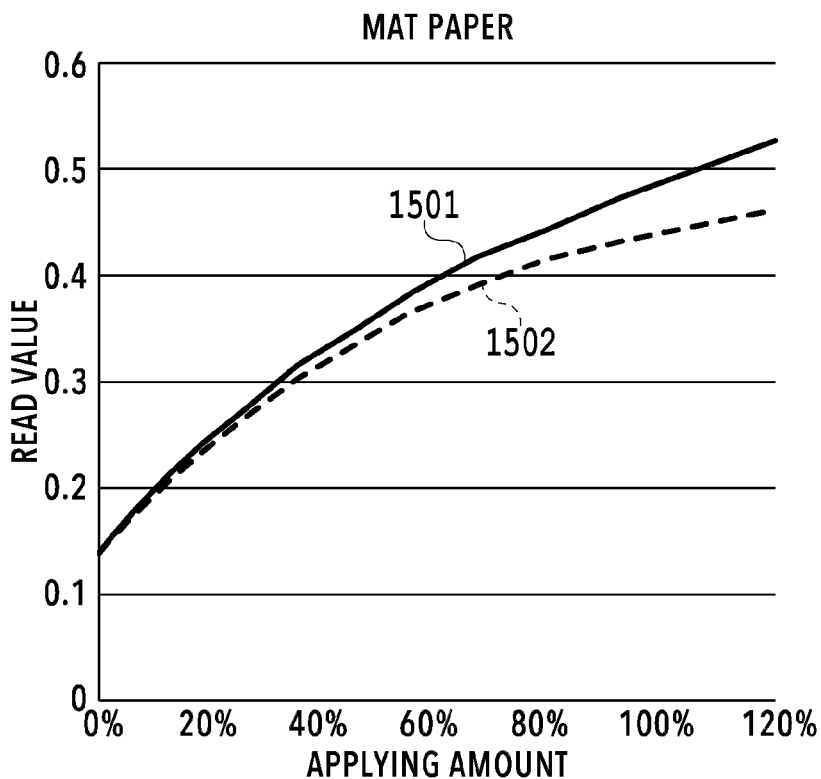
FIG. 15A and FIG. 15B are each a density characteristic of a patch printed by mixing green ink whose an applying amount is 80% with fluorescent pink ink by changing the applying amount of the fluorescent pink ink.
Figure 15B:
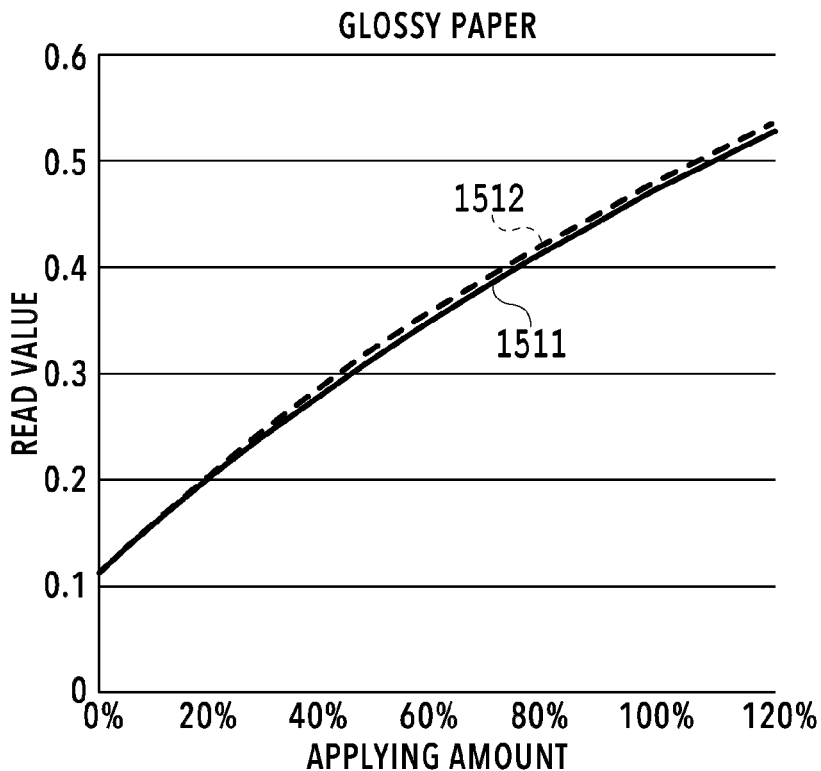

FIG. 15A and FIG. 15B are each a diagram showing the density characteristic that is calculated by using a measured value of a halftone patch of fluorescent pink ink.

FIG. 15A shows an example in which the density value is calculated in accordance with formula 2 by using the measured value of the patch obtained by printing the fluorescent pink halftone patch on mat paper by mixing fluorescent pink ink specified by the fluorescent pink halftone patch with green ink. A solid line 1501 in FIG. 15A shows the density value that is calculated based on the measured value of the patch in a case where green ink is not discharged after fluorescent pink ink. In contrast to this, a broken line 1502 shows the density value that is calculated based on the measured value of the patch in a case where green ink is discharged after fluorescent pink ink.

FIG. 15B shows an example in which the density value is calculated in accordance with formula 2 by using the measured value of the patch obtained by printing the fluorescent pink halftone patch on glossy paper by mixing fluorescent pink ink specified by the fluorescent pink halftone patch with green ink. A solid line 1511 in FIG. 15B shows the density value that is calculated based on the measured value of the patch in a case where green ink is not discharged after fluorescent pink ink. In contrast to this, a broken line 1512 shows the density value that is calculated based on the measured value of the patch in a case where green ink is discharged after fluorescent pink ink.

As regards mat paper, as shown in FIG. 14A and FIG. 14B, from the spectral reflection in the vicinity of $\lambda=600$ nm, it can be seen that the light-emitting wavelength of fluorescent pink is more absorbed in a case where green ink is not discharged after fluorescent pink ink than in a case where green ink is discharged after fluorescent pink ink.

On the other hand, as regards glossy paper, as shown in FIG. 14C and FIG. 14D, from the spectral reflectance in the vicinity of $\lambda=600$ nm, it seems that the absorption efficiency of the light-emitting wavelength is the same, but as shown in FIG. 15A and FIG. 15B, the density values are different. That is, in a case of glossy paper, it can be seen that the light-emitting wavelength of fluorescent pink is more absorbed in a case where green ink is discharged after fluorescent pink ink than in a case where green ink is not discharged after fluorescent pink ink.

Consequently, it is possible to determine that the S/N ratio of the sensor increases in a case where green ink is not discharged after fluorescent pink ink at the time of printing a patch on mat paper. Further, it is possible to determine that the S/N ratio of the sensor increases in a case where green ink is discharged after fluorescent pink ink at the time of printing a patch on glossy paper.

<About Patch Chart>

Figure 13:
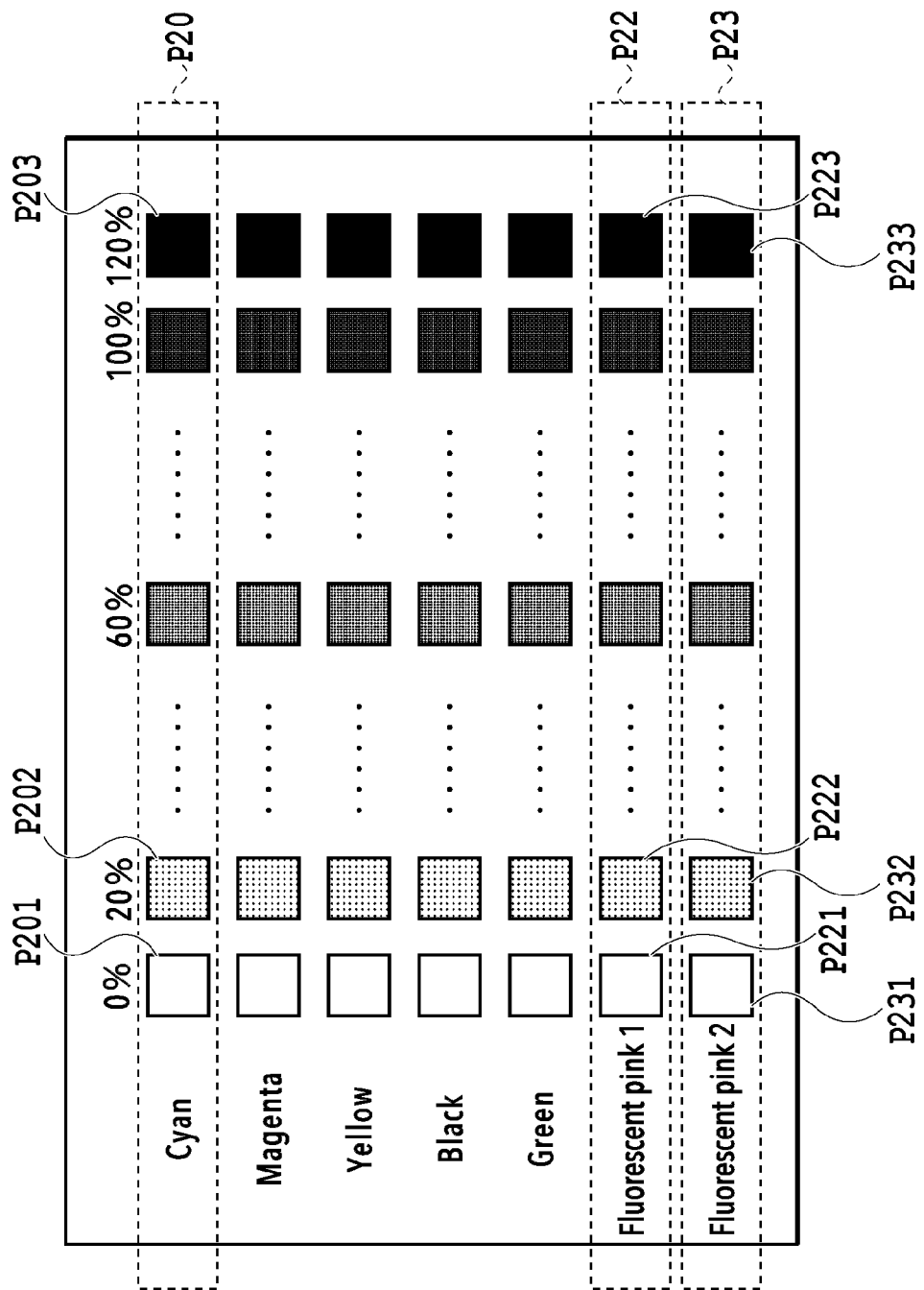
FIG. 13 is a diagram showing a patch chart.

FIG. 13 shows an example of the patch chart in the present embodiment. In the present embodiment, the patch of fluorescent pink is printed with the color material of fluorescent pink whose input signal is changed at an interval of 20% and the color material of green fixed to an input signal of a predetermined constant applying amount of 80%.

A patch group P22 of Fluorescent pink 1 in FIG. 13 is a patch group for which green ink is not discharged after fluorescent pink ink. P221 is printed with an applying amount of 0% of fluorescent pink and an applying amount of 80% of green, P222 is printed with an applying amount of 20% of fluorescent pink and an applying amount of 80% of green, and P223 is printed with an applying amount of 120% of fluorescent pink and an applying amount of 80% of green.

In contrast to this, a patch group P23 of Fluorescent pink 2 is a patch group for which green ink is discharged after fluorescent pink ink. P231 is printed with an applying amount of 0% of fluorescent pink and an applying amount of 80% of green, P232 is printed with an applying amount of 20% of fluorescent pink and an applying amount of 80% of green, and P233 is printed with an applying amount of 120% of fluorescent pink and an applying amount of 80% of green.

As the method of controlling the printing order of ink, it may also be possible to adopt any method. As the method of controlling the printing order in a so-called serial ink jet printer that performs printing by causing a print head that discharges ink to scan in the direction that intersects with a printing medium, there is a method as follows.

For example, in a case where printing is completed by causing the print head to perform scanning 16 times, it is possible to discharge green ink after fluorescent pink ink by discharging fluorescent pink ink at the time of the first eight-time scanning and discharging green ink at the time of the subsequent eight-time scanning. Further, by discharging both fluorescent pink and green ink at the time of the 16-time scanning, it is possible not to discharge green ink after fluorescent pink ink. The number of times of scanning is not limited to eight, 16 and the like and it may also be possible to perform scanning another number of times.

Even in a case where green ink is discharged after fluorescent pink ink, there may be a scan in which both green ink and fluorescent pink ink are discharged. Further, even in a case where green ink is not discharged after fluorescent pink ink, there may be a scan in which none of green ink and fluorescent pink ink is discharged.

It may also be possible to control the printing order of ink by changing the discharge port of fluorescent pink ink and the discharge port of green ink in the print head or by changing the position of the printing medium by discharge of ink. Further, it may also be possible to control the printing order by using a so-called multipass mask.

Figure 16:
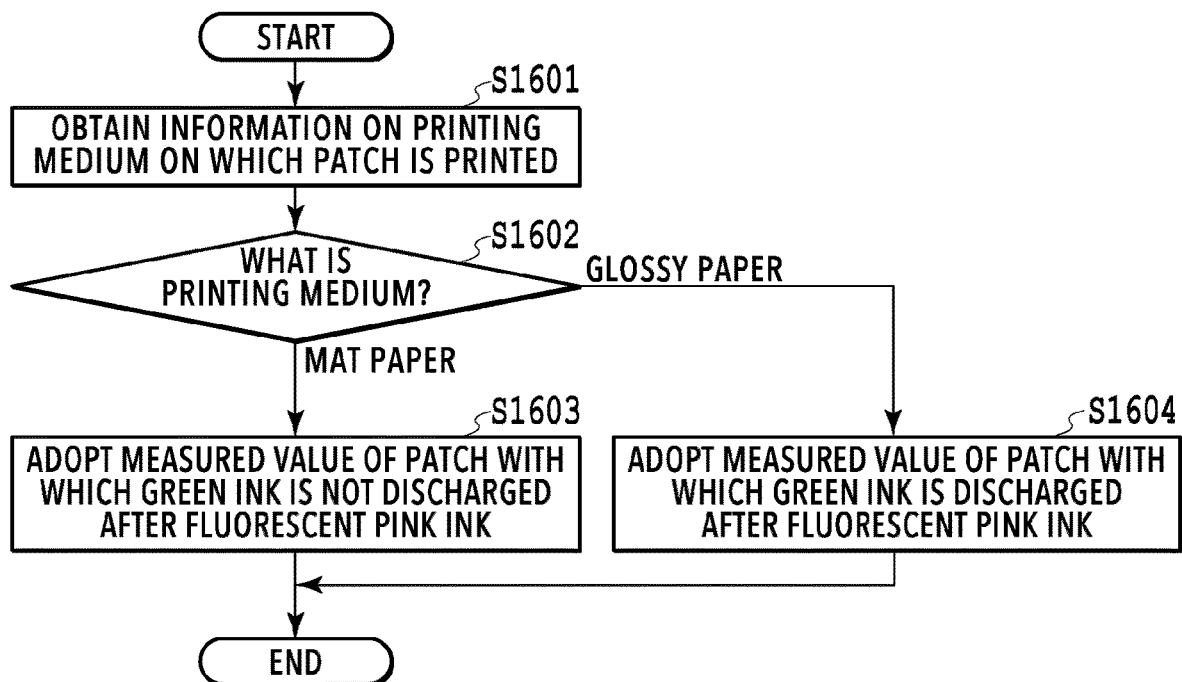
FIG. 16 is a flowchart of processing to selectively adopt a measured value of a fluorescent pink patch used for generation of 1D-LUT data.

FIG. 16 is a flowchart of processing to selectively adopt a measured value of a fluorescent pink patch used for generation of 1D-LUT data that is used in the calibration processing unit 107. Each piece of processing shown in FIG. 16 may be performed by the CPU 403 of the PC 401 or the printer control unit 409 of the printer 407.

First, at S1601, information on a printing medium on which a patch is printed is obtained.

At S1602, by using the information obtained at S1601, whether the printing medium on which the patch is printed is mat paper or glossy paper. In a case where it is determined that the printing medium is mat paper by determination results at this step, the processing advances to S1603 and on the other hand, in a case where it is determined that the printing medium is glossy paper, the processing advances to S1604.

At S1603, a measured value with which green ink is not discharged after fluorescent pink is adopted.

At S1604, a measured value with which green ink is discharged after fluorescent pink ink is adopted.

In the present embodiment, the patch pattern example (see FIG. 13) is shown in which both the patch group for which green ink is not discharged after fluorescent pink ink and the patch group for which green ink is discharged after fluorescent pink ink are printed. However, it is not necessarily required to print both the patch groups and it may also be possible to print only the patch group that is used for generation of 1D-LUT data and measure the printed patch group in accordance with the kind of printing medium on which the patch is printed.

Further, the kinds of printing medium are not limited to glossy paper and mat paper and another kind of printing medium may be used.

Furthermore, it may also be possible to measure the surface roughness of a printing medium on which printing is performed and determine a patch group among a plurality of printed patch groups, from which measured values are adopted, based on the measured surface roughness, determine a patch group that is printed among a plurality of patch groups, and so on. For example, it is considered that in a case where the measured surface roughness is larger than a predetermined threshold value, the measured values of the patch group P22 of Fluorescent pink 1 are adopted and in a case where the surface roughness is less than or equal to the predetermined threshold value, the measured values of the patch group P23 of Fluorescent pink 2 are adopted.

Further, the kind of printing medium is not necessarily set in accordance with surface roughness. For example, the kind of printing medium may be set in advance in accordance with the S/N ratio or the like of the sensor.

Effects of the Present Embodiment

As explained above, in the present embodiment, the printing order of fluorescent ink and subtractive color mixture ink at the time of printing a patch used for generation of 1D-LUT data, which is used for calibration, is changed in accordance with a printing medium. Due to this, the S/N ratio of the sensor increases and it is possible to improve the correction accuracy.

Third Embodiment

In the first embodiment, the aspect is explained in which printing is performed by mixing fluorescent pink ink with green ink. In contrast to this, in the present embodiment, in place of performing printing by mixing green ink, which is subtractive color mixture ink, an optical filter is installed on the light-receiving side of the sensor.

Figure 11A:
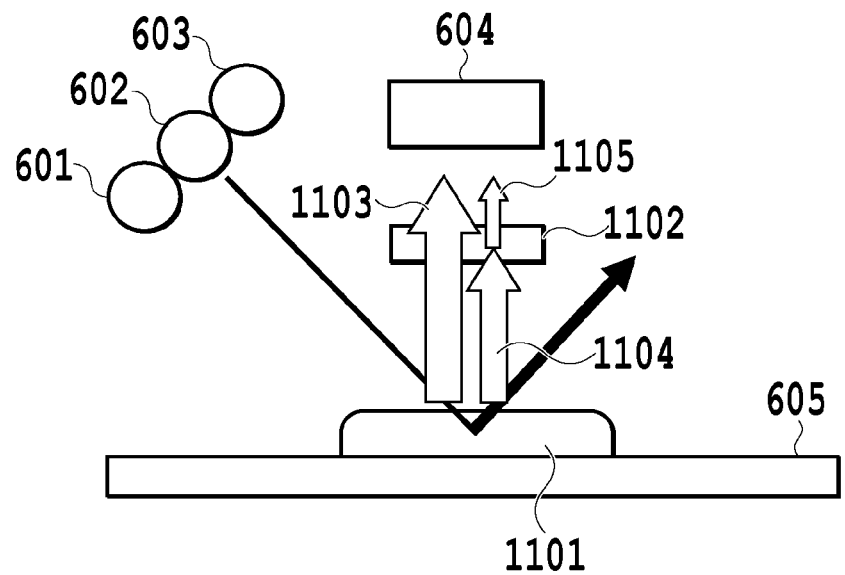
FIG. 11A and FIG. 11B are each a diagram schematically showing a relationship between reflected light and emitted light due to fluorescence in a case where fluorescent pink ink discharged onto a sheet is measured with a color sensor in which an optical filter (green filter) is installed.

Specifically, as shown in FIG. 11A, an optical filter 1102 is installed at a position at which light with which the printed surface is irradiated by an LED is received by a sensor. In a case of fluorescent pink ink 1101, as the candidate of the optical filter, it is possible to designate a green filter as in the case of green ink in the first embodiment. By using a green filter, part of light emitted due to fluorescence (indicated by arrow 1104) is cut (indicated by arrow 1105) and a change in amount of reflected light (indicated by arrow 1103) is separated and detected. Then, it is possible to perform calibration by estimating the volume of discharge based on the detected change in amount of reflected light. That is, in this example, the change in amount of emitted light in the vicinity of λ=600 nm (see FIG. 8B) for which it is not convenient to detect the change in amount of reflected light accompanying the change in volume of discharge is suppressed by the optical filter.

Figure 11B:
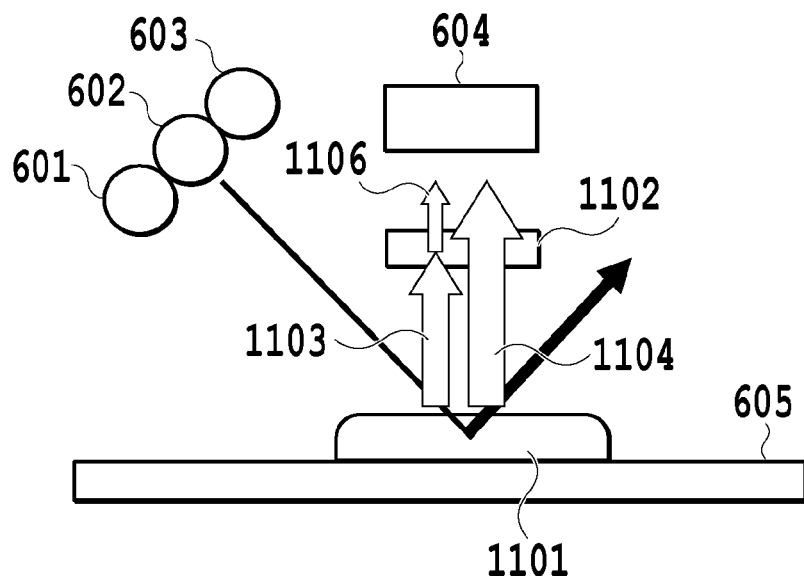

Further, in a case where the optical filter is used, it is possible not only to detect the change in amount of reflected light by suppressing the amount of emitted light but also to detect the change in amount of emitted light by suppressing the change in amount of reflected light. As shown in FIG. 11B, it is also possible to separate and detect the change in amount of emitted light (indicated by arrow 1102) by cutting (indicated by arrow 1106) part of reflected light (indicated by arrow 1103) in the activation wavelength area by using a red filter as the optical filter 1102. Then, it is possible to perform calibration by estimating the volume of discharge based on the detected change in amount of emitted light. That is, in this example, the change in amount of reflected light in the vicinity of λ=540 nm (see FIG. 8B) for which it is not convenient to detect the change in amount of emitted light accompanying the change in volume of discharge is suppressed by the optical filter.

Effects of the Present Embodiment

According to the present embodiment, it is possible to implement, at a low cost, highly accurate color calibration in a printing apparatus that performs printing using fluorescent ink.

OTHER EMBODIMENTS

In the embodiments described previously, as the printing method of the printing apparatus, the ink jet method is adopted, but the printing method of the printing apparatus is not limited to the ink jet method and other printing methods, such as the electrophotographic method and the thermal transfer method, may be adopted.

Further, for explanation of the measured value of the sensor, the refection coefficient is used, but it may also be possible to use the density or the color value (CIE L*a*b*, tri-stimulus values XYZ and the like) calculated based on the reflection coefficient.

In the embodiments described previously, explanation is given on the assumption that the patch chart for calibration is the halftone patch, but it may also be possible to generate a correction table by estimating the volume of discharge of a certain specific tone.

In the embodiments described previously, explanation is given on the assumption that the light-receiving element of the color sensor is a photodiode. However, it may also be possible for the light-receiving element of the color sensor to have a configuration, such as a phototransistor.

In the embodiments described previously, the configuration in which the color sensor is mounted on the side surface of the carriage is explained (see FIG. 5). However, the configuration may be one in which the color sensor is mounted at a position other than the side surface of the carriage or one in which it is possible to measure the patch manually.

In the embodiments described previously, the configuration in which the color sensor has the LEDs of RGB is explained (see FIG. 6A and FIG. 6B). However, the LEDs of the color sensor may be LEDs other than RGB and it may also be possible for the color sensor to have LEDs of three or more colors of LEDs of three or less colors.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. It may also be possible to appropriately combine the contents of the embodiments described previously.

According to one embodiment of the present invention, it is possible to implement, at a low cost, highly accurate color calibration in a printing apparatus that performs printing using fluorescent ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-019362, filed Feb. 9, 2021, which is hereby incorporated by reference wherein in its entirety.

What is claimed is:

1. An image processing apparatus comprising:
a print control unit configured to control a printing unit to print a first patch image using fluorescent ink and subtractive mixed color ink whose reflectance in an activation wavelength of the fluorescent ink is higher than reflectance in a light-emitting wavelength of the fluorescent ink, and to print a second patch image using the subtractive mixed color ink; and
a processing unit configured to perform, based on a measurement value obtained by measuring the first patch image, calibration processing for the fluorescent ink, and to perform, based on a measurement value obtained by measuring the second patch image, calibration processing for the subtractive mixed color ink.

2. The image processing apparatus according to claim 1, wherein
the calibration processing is processing to correct a density output by the printing unit with respect to an input color value.

3. The image processing apparatus according to claim 1, wherein
the second patch image is printed using only the subtractive mixed color ink.

4. The image processing apparatus according to claim 1, wherein
the fluorescent ink is fluorescent pink ink, fluorescent yellow ink, fluorescent blue ink, fluorescent green ink, fluorescent orange ink, or fluorescent red ink.

5. The image processing apparatus according to claim 1, wherein
the subtractive mixed color ink is cyan ink, yellow ink, magenta ink, green ink, red ink, or orange ink.

6. The image processing apparatus according to claim 1, wherein
the first patch image and the second patch image are printed on a same printing medium.

7. An image processing method that is performed by an image processing apparatus, the image processing method comprising:
controlling a printing unit to print a first patch image using fluorescent ink and subtractive mixed color ink whose reflectance in an activation wavelength of the fluorescent ink is higher than reflectance in a light-emitting wavelength of the fluorescent ink, and to print a second patch image using the subtractive mixed color ink;
performing, based on a measurement value obtained by measuring the first patch image, calibration processing for the fluorescent ink; and
performing, based on a measurement value obtained by measuring the second patch image, calibration processing for the subtractive mixed color ink.

8. The image processing method according to claim 7, wherein
the calibration processing is processing to correct a density output by the printing unit with respect to an input color value.

9. The image processing method according to claim 7, wherein
the second patch image is printed using only the subtractive mixed color ink.

10. The image processing method according to claim 7, wherein
the fluorescent ink is fluorescent pink ink, fluorescent yellow ink, fluorescent blue ink, fluorescent green ink, fluorescent orange ink, or fluorescent red ink.

11. The image processing method according to claim 7, wherein
the subtractive mixed color ink is cyan ink, yellow ink, magenta ink, green ink, red ink, or orange ink.

12. The image processing method according to claim 7, wherein
the first patch image and the second patch image are printed on a same printing medium.

13. A non-transitory computer readable storage medium storing a program for causing a computer to perform an image processing method that is performed by an image processing apparatus, the image processing method comprising:
controlling a printing unit to print a first patch image using fluorescent ink and subtractive mixed color ink whose reflectance in an activation wavelength of the fluorescent ink is higher than reflectance in a light-emitting wavelength of the fluorescent ink, and to print a second patch image using the subtractive mixed color ink;
performing, based on a measurement value obtained by measuring the first patch image, calibration processing for the fluorescent ink; and
performing, based on a measurement value obtained by measuring the second patch image, calibration processing for the subtractive mixed color ink.

14. The non-transitory computer readable storage medium according to claim 13, wherein
the calibration processing is processing to correct a density output by the printing unit with respect to an input color value.

15. The non-transitory computer readable storage medium according to claim 13, wherein
the second patch image is printed using only the subtractive mixed color ink.

16. The non-transitory computer readable storage medium according to claim 13, wherein
the fluorescent ink is fluorescent pink ink, fluorescent yellow ink, fluorescent blue ink, fluorescent green ink, fluorescent orange ink, or fluorescent red ink.

17. The non-transitory computer readable storage medium according to claim 13, wherein
the subtractive mixed color ink is cyan ink, yellow ink, magenta ink, green ink, red ink, or orange ink.

18. The non-transitory computer readable storage medium according to claim 13, wherein
the first patch image and the second patch image are printed on a same printing medium.

\* \* \* \* \*